US012454347B2

(12) United States Patent
Irwin, III et al.

(10) Patent No.: US 12,454,347 B2
(45) Date of Patent: Oct. 28, 2025

(54) METHODS AND APPARATUS FOR ALLOCATING CONTROL EFFECTOR COMMANDS TO REDUCE VEHICLE DEVIATIONS FROM A COMMANDED TRAJECTORY

(71) Applicant: The Boeing Company, Arlington, VA (US)

(72) Inventors: Joseph George Irwin, III, Landenberg, PA (US); Pieter Gerard Einthoven, West Chester, PA (US); Benjamin Horn Oster, Media, PA (US); Patrick Smith, Philadelphia, PA (US)

(73) Assignee: The Boeing Company, Arlington, VA (US)

( * ) Notice: Subject to any disclaimer, the term of this patent is extended or adjusted under 35 U.S.C. 154(b) by 33 days.

(21) Appl. No.: 18/393,495

(22) Filed: Dec. 21, 2023

(65) Prior Publication Data

US 2025/0206439 A1 Jun. 26, 2025

(51) Int. Cl.
*B64C 13/00* (2006.01)
*B64C 9/10* (2006.01)
*B64C 13/16* (2006.01)
*B64C 13/50* (2006.01)
*G05D 1/646* (2024.01)

(52) U.S. Cl.
CPC ............. *B64C 13/16* (2013.01); *B64C 9/10* (2013.01); *B64C 13/503* (2013.01); *G05D 1/646* (2024.01)

(58) Field of Classification Search
CPC ......... B64C 13/16; B64C 9/10; B64C 13/503; G05D 1/646
See application file for complete search history.

(56) References Cited

U.S. PATENT DOCUMENTS 8,185,255 B2 5/2012 Lavretsky et al.
11,465,734 B1 * 10/2022 Wiegman ............... B64D 31/10

* cited by examiner

Primary Examiner — Ian Jen
(74) Attorney, Agent, or Firm — Hanley, Flight & Zimmerman, LLC

(57) ABSTRACT

Methods and apparatus for allocating control effector commands to reduce vehicle deviations from a commanded trajectory. An example apparatus includes interface circuitry, machine readable instructions, and programmable circuitry to at least one of instantiate or execute the machine readable instructions to receive control force or moment command input associated with an over-actuated vehicle, the over-actuated vehicle including a first actuator and a second actuator, apply a rate or position limit based on actuator capability, and reassign control from the first actuator to the second actuator based on a lagged command position of the first actuator to preserve a control trajectory of the vehicle.

20 Claims, 17 Drawing Sheets

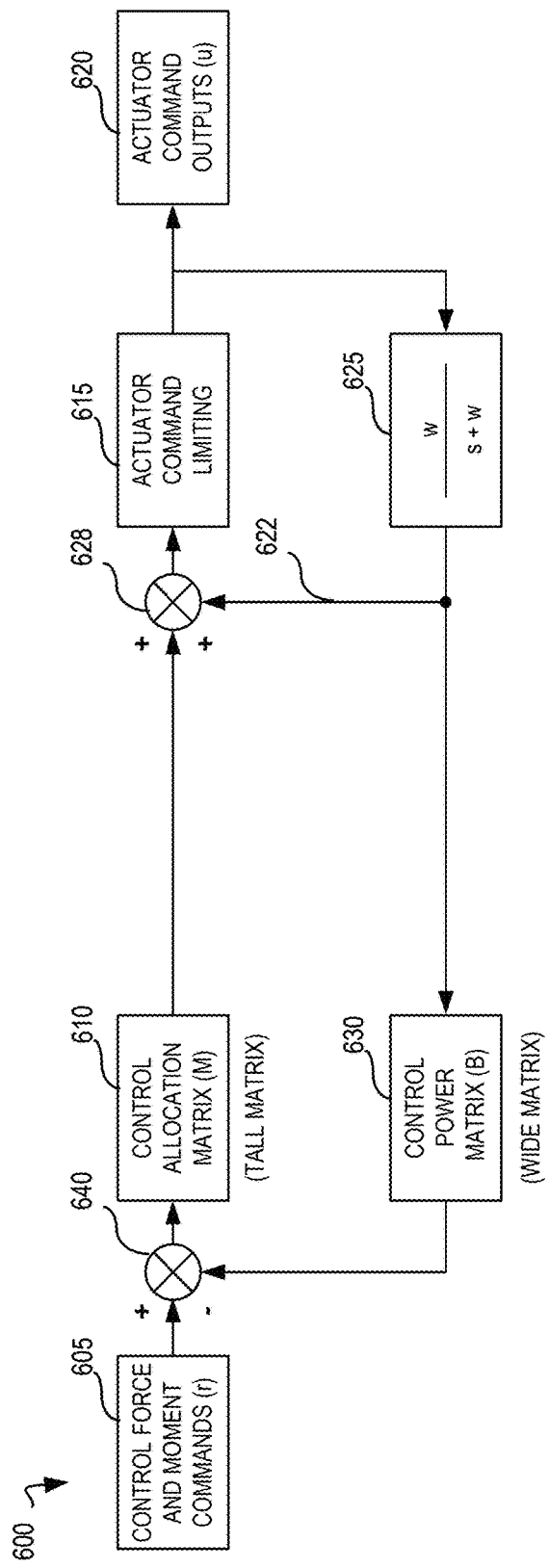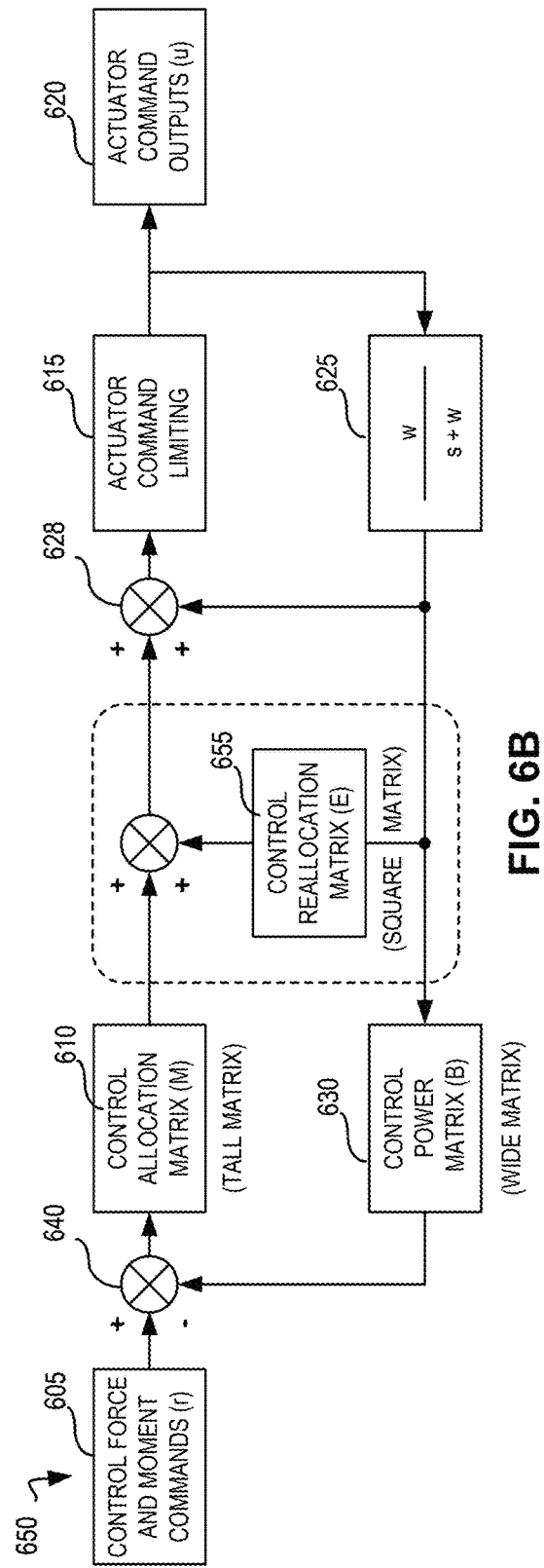
FIG. 6A
FIG. 6B

METHODS AND APPARATUS FOR ALLOCATING CONTROL EFFECTOR COMMANDS TO REDUCE VEHICLE DEVIATIONS FROM A COMMANDED TRAJECTORY

FIELD OF THE DISCLOSURE

This patent relates generally to a control system and, more particularly, to methods and apparatus for allocating control effector commands to reduce vehicle deviations from a commanded trajectory.

BACKGROUND

A control law refers to a computer software algorithm that transforms movements made by a vehicle pilot or an autopilot into movements of the vehicular control effectors. For example, the movements are converted to electrical signals which are transmitted to vehicle-based control computers that determine how to move each control surface.

SUMMARY

An example apparatus includes interface circuitry, machine readable instructions, and programmable circuitry to at least one of instantiate or execute the machine readable instructions to receive control force or moment command input associated with an over-actuated vehicle, the over-actuated vehicle including a first actuator and a second actuator, apply a rate or position limit based on actuator capability, and reassign control from the first actuator to the second actuator based on a lagged command position of the first actuator to preserve a control trajectory of the vehicle.

An example method includes receiving control force or moment command input associated with an over-actuated vehicle, the over-actuated vehicle including a first actuator and a second actuator, applying a rate or position limit based on actuator capability, and reassigning control from the first actuator to the second actuator based on a lagged command position of the first actuator to preserve a control trajectory of the vehicle.

An example non-transitory machine readable storage medium includes instructions to cause programmable circuitry to at least receive control force or moment command input associated with an over-actuated vehicle, the over-actuated vehicle including a first actuator and a second actuator, apply a rate or position limit based on actuator capability, and reassign control from the first actuator to the second actuator based on a lagged command position of the first actuator to preserve a control trajectory of the vehicle.

BRIEF DESCRIPTION OF THE DRAWINGS

FIG. 6A illustrates an example diagram without equalization, where feedback automatically reallocates control to other actuators when a limit is impinged.

FIG. 6B illustrates an example diagram including a control reallocation matrix to equalize actuator positions to an objective function.

Figure 1:
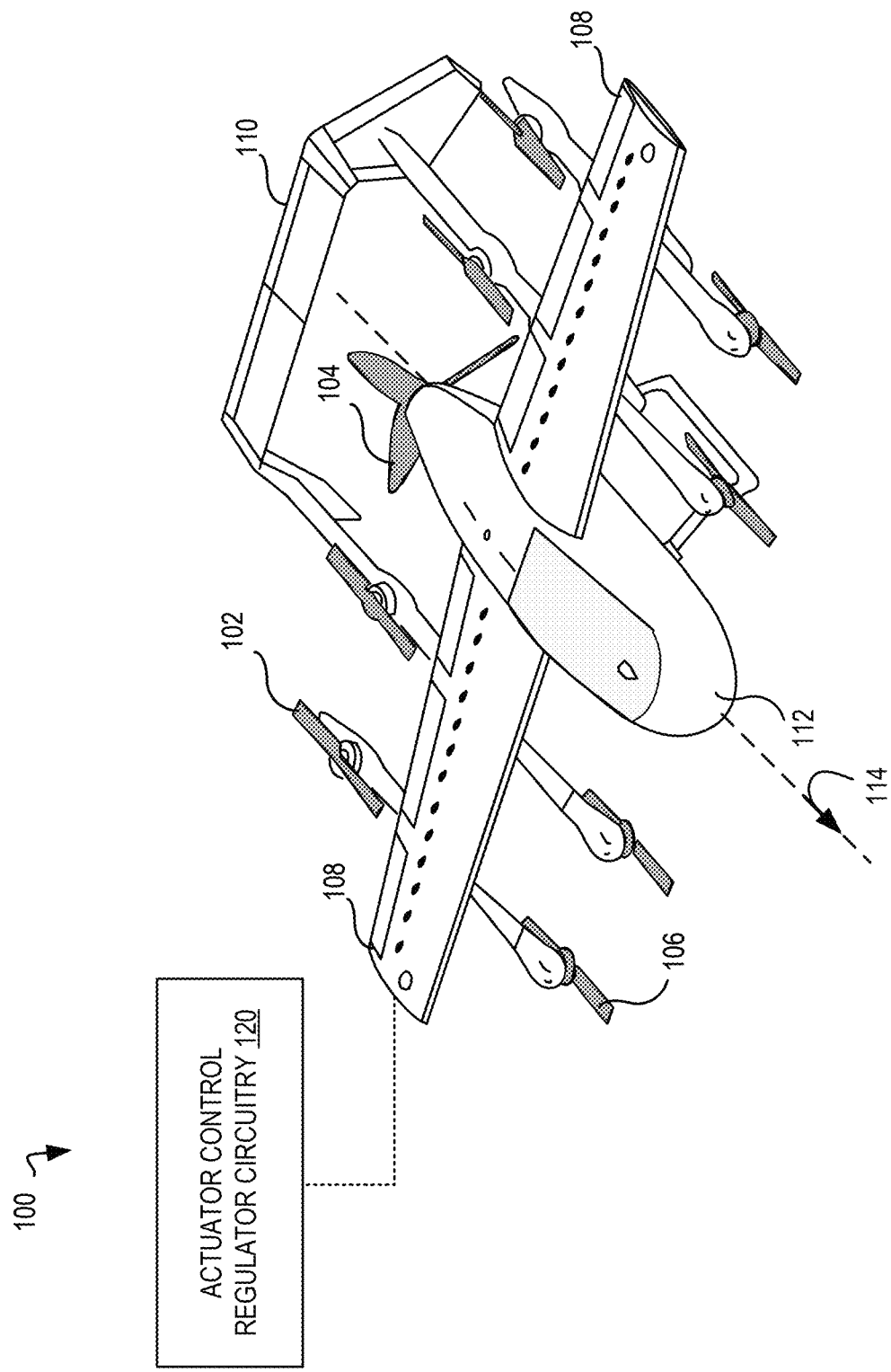
FIG. 1 illustrates an example aircraft in which the examples disclosed herein can be implemented.

In general, the same reference numbers will be used throughout the drawing(s) and accompanying written description to refer to the same or like parts. The figures are not to scale. Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

DETAILED DESCRIPTION

Aircraft equipped with fly-by-wire flight control systems employ software to allocate control moment and force commands to control surfaces. Surfaces are often redundant and produce coupled forces and moments in more than one control axis. For example, an aileron deflection produces changes in roll moment, yaw moment, drag force, and lift force. In another example, a multi-rotor aircraft varies the speed of any one rotor to produce pitch, roll, and yaw moments. The example aircraft of FIG. 1 is over-actuated, given eight rotors controlling four degrees of freedom (pitch, roll, yaw, and heave). While the aircraft can be controlled following the loss of any rotor, the control allocation must change to reduce deviations from the commanded trajectory.

Methods and apparatus disclosed herein allocate vehicle control force and moment commands to the vehicle's control effectors in a manner that reduces deviations from a commanded trajectory during both degraded and normal operation. Degraded operation may consist of a performance degradation of a control effector (e.g., a total loss of function), a partial loss of function, or impingement upon an authority limit, a rate-limit, or a force-limit (i.e., not actuating to a commanded position for any reason). In examples herein, integrators are incorporated into a feedback path to avoid introducing unwanted lag during normal operation that would increase vehicle deviations from a commanded trajectory. The integrators correct for degraded operation of one or more control effectors with a prescribed lag and reduce deviations from commanded trajectory versus a system without automatic control re-allocation.

Methods and apparatus disclosed herein include software-based primary control allocation mixing for trajectory control, secondary control reallocation mixing having no effect on trajectory control, control de-mixing, and feedback of the de-mixed control signals. One or more control reallocation matrices may be selected to balance control effector commands and achieve different secondary objective functions of lesser importance than the primary trajectory control function. Furthermore, methods and apparatus disclosed herein manage actuator rate-limit impingement in a highly coupled Multi-Input Multi-Output (MIMO) system (e.g., such that control trajectories are unaffected). An actuator command rate limiter preserves a control trajectory in the presence of a rate limit impingement for all coupled outputs. Furthermore, methods and apparatus disclosed herein can introduce a complementary filter to use measured actuator outputs for reducing deviations from a commanded trajectory in the presence of undetected and/or undeclared control effector degradations.

Turning to the figures, FIG. 1 illustrates an example aircraft 100 in which the examples disclosed herein can be implemented. While in the example of FIG. 1 the aircraft 100 is an electric vertical take-off and landing (eVTOL) aircraft, the aircraft 100 may be any other type of air vehicle, water vehicle, land vehicle, and/or space vehicle. In the illustrated example, the aircraft 100 includes a back rotor 102, a propeller 104, front rotors 106, wings 108 (e.g., a right wing and a left wing), a tail with rudders 110 and a cockpit 112. A longitudinal axis 114 of the aircraft 100 is labeled in FIG. 1.

In the example of FIG. 1, the aircraft 100 includes actuator control regulator circuitry 120. The actuator control regulator circuitry 120 controls effector commands to reduce vehicle deviations from a commanded flight trajectory. For example, the actuator control regulator circuitry 120 feeds back de-mixed control outputs to automatically reallocate output commands without introducing lag in a nominal control loop and manages actuator rate and position limit impingement in a MIMO-based system, as described in more detail in examples disclosed herein. In examples disclosed herein, the actuator control regulator circuitry 120 can be used in over-actuated vehicles (e.g., vehicles with more actuators than systems-based degrees-of-freedom). For example, the actuator control regulator circuitry 120 can be used for a drone having numerous trailing edge flaps that control drone movement to control the edge flaps in the presence of a performance deviation of one of the flaps. Similarly, an over-actuated vehicle can include an aerial vehicle specifically designed for tasks requiring high maneuverability. In some examples, over-actuating a vehicle provides a certain amount of redundancy for the flight control system, permitting recovery from off-nominal conditions. Methods and apparatus disclosed herein maximize performance of over-actuated vehicles, eliminate lags in feedforward information flow, and introduce reconfiguration to maintain control while attaining minimal deviations from a commanded trajectory.

Figure 2:
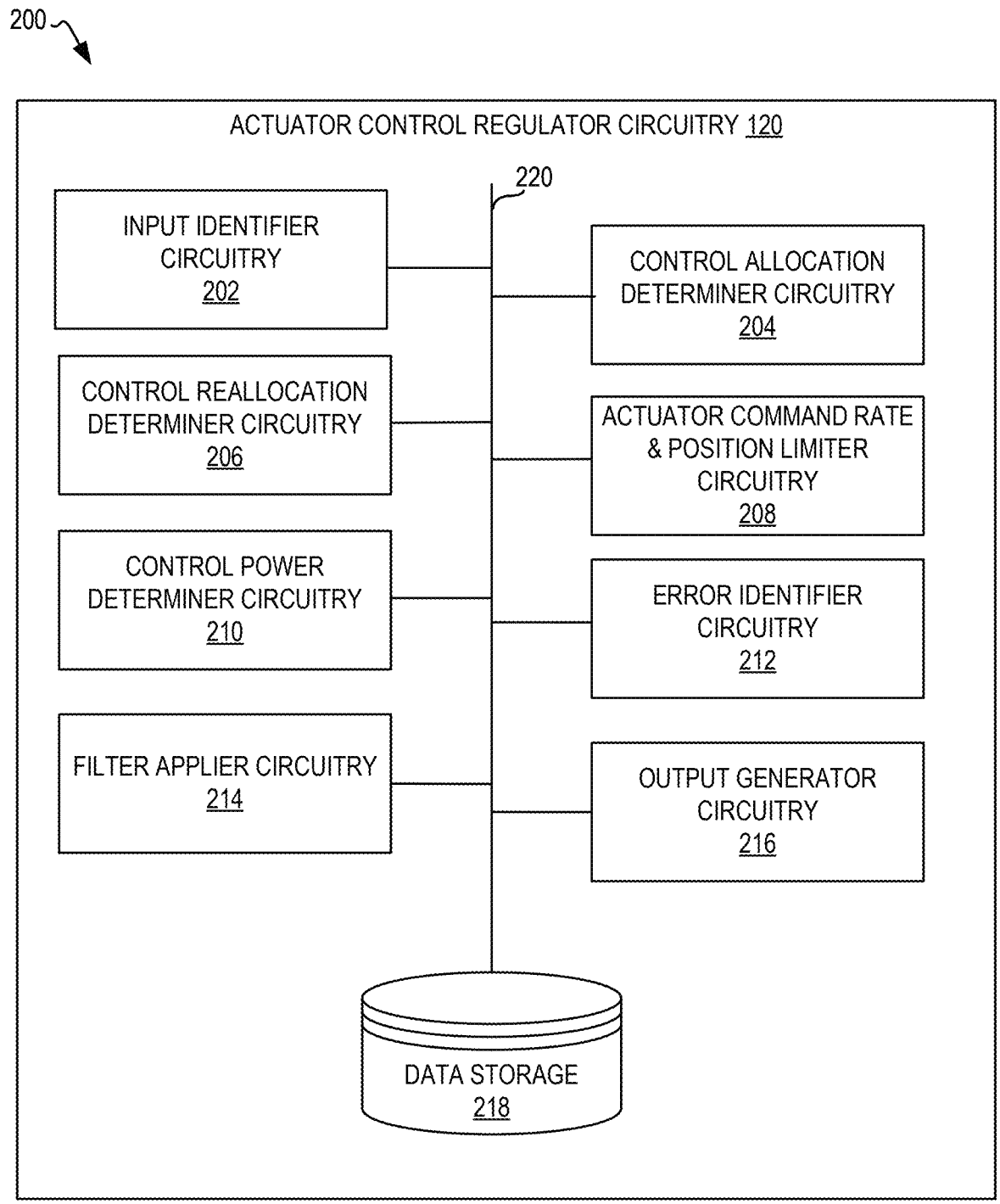
FIG. 2 is a block diagram representative of example actuator control regulator circuitry that may be implemented in accordance with teachings disclosed herein.

FIG. 2 is a block diagram 200 of an example implementation of the actuator control regulator circuitry 120 of FIG. 1. The actuator control regulator circuitry 120 of FIG. 1 may be instantiated (e.g., creating an instance of, bring into being for any length of time, materialize, implement, etc.) by processor circuitry such as a central processing unit executing instructions. Additionally or alternatively, the actuator control regulator circuitry 120 of FIG. 1 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

In the illustrated example, the actuator control regulator circuitry 120 of FIG. 1 includes example input identifier circuitry 202, example control allocation determiner circuitry 204, example control reallocation determiner circuitry 206, example actuator command rate and position limiter circuitry 208, example control power determiner circuitry 210, example error identifier circuitry 212, example filter applier circuitry 214, example output generator circuitry 216, and example data storage 218. In the example of FIG. 2, the input identifier circuitry 202, control allocation determiner circuitry 204, control reallocation determiner circuitry 206, actuator command rate and position limiter circuitry 208, control power determiner circuitry 210, error identifier circuitry 212, filter applier circuitry 214, output generator circuitry 216, and/or data storage 218 are in communication using example bus 220.

The input identifier circuitry 202 receives control force and moment command(s). For example, the input identifier circuitry 202 receives control force and moment command(s) that depend on the type of vehicle (e.g., type of over-actuated vehicle). For example, the input identifier circuitry 202 can receive control force and moment commands associated with various controls associated with a particular type of vehicle (e.g., collective pitch control, throttle control, antitorque control, cyclic pitch control, etc.). In some examples, the control force and moment command(s) can be associated with real time allocation of control of pilot or auto-pilot flight commands among the aircraft's control effector actuators (e.g., a control command vector, etc.).

The control allocation determiner circuitry 204 performs control allocation using a control allocation matrix. In some examples, the control allocation determiner circuitry 204 determines control allocation without the presence of actuator position feedback and/or equalization (e.g., performed using the control reallocation determiner circuitry 206). For example, the control allocation determiner circuitry 204 receives control force and moment command(s) from the input identifier circuitry 202 and initiates actuator commands as a fixed mixer with no lag.

The control reallocation determiner circuitry 206 performs control reallocation using a control reallocation matrix. For example, the control reallocation determiner circuitry 206 equalizes actuator positions to an objective function. The control reallocation determiner circuitry 206 reallocates control in a reactionless manner using a trim allocation matrix (e.g., an objective function) in steady state and does not need to match the control allocation matrix generated using the control allocation determiner circuitry 204.

The actuator command rate and position limiter circuitry 208 applies authority and rate limits. In examples disclosed herein, the actuator command rate and position limiter circuitry 208 is a Multi-Input Multi-Output (MIMO) system-based rate limiter that preserves control trajectories for coupled actuators by slowing all coupled actuators by the same scale factor as a critical actuator. In some examples, the actuator command rate and position limiter circuitry 208 slows down all rotor accelerations for a hovering multicopter when the critical rotor impinges an acceleration limit, such that the speed of uncoupled actuators is not slowed by other uncoupled actuators (e.g., an aileron is not slowed when a propeller impinges a rate limit). In examples disclosed herein, the actuator command rate and position limiter circuitry 208 initiates feedback of a lagged command position associated with a transfer function (e.g., $(s+\omega)/s$).

The control power determiner circuitry 210 determines control power using a control power matrix. For example, the control power determiner circuitry 210 uses a control power matrix to predict forces and moments generated by actuator positions. In some examples, the control power determiner circuitry 210 receives input(s) from the control reallocation determiner circuitry 206 and/or filtered actuator position signals from a complementary filter, as described in more detail in connection with FIG. 7.

The error identifier circuitry 212 identifies an error signal indicating a difference between a predicted force/moment generated by actuator command output and a desired force input to determine whether to perform reassignment of control to other actuator(s). For example, the error identifier circuitry 212 identifies errors in actuator performance allocation to avoid the errors from becoming altitude (alt), velocity (vel), and/or roll, pitch, yaw rate (pqr) errors. For example, errors in one actuator performance or desired force and/or moment can be mitigated by adjusting the commands to the remaining actuators.

The filter applier circuitry 214 applies a complementary filter to obtain low frequency component(s) from the actuator nonlinear dynamics and high frequency component(s) from low-fidelity actuator model estimates. In some examples, the filter applier circuitry 214 attenuates high-frequency vibratory content in the feedback signal using a notch filter positioned upstream and/or downstream of the complementary filter. In some examples, the filter applier circuitry 214 feeds back a combination of a high frequency component and low frequency component to form a unity gain transfer function that is received by the control power determiner circuitry 210.

The output generator circuitry 216 generates outputs, including actuator command output(s) and/or control output(s). In some examples, the output generator circuitry 216 receives outputs from the actuator command rate and position limiter circuitry 208, as shown in the examples of FIGS. 6A, 6B, and/or 7.

The data storage 218 can be used to store any information associated with the input identifier circuitry 202, control allocation determiner circuitry 204, control reallocation determiner circuitry 206, actuator command rate and position limiter circuitry 208, control power determiner circuitry 210, error identifier circuitry 212, filter applier circuitry 214, and/or output generator circuitry 216. The example data storage 218 of the illustrated example of FIG. 2 can be implemented by any memory, storage device and/or storage disc for storing data such as flash memory, magnetic media, optical media, etc. Furthermore, the data stored in the example data storage 218 can be in any data format such as binary data, comma delimited data, tab delimited data, structured query language (SQL) structures, image data, etc.

In some examples, the apparatus includes means for identifying input. For example, the means for identifying input may be implemented by the input identifier circuitry 202. In some examples, the input identifier circuitry 202 may be instantiated by processor circuitry such as the example processor circuitry 1312 of FIG. 13. For instance, input identifier circuitry 202 may be instantiated by the example microprocessor 1400 of FIG. 14 executing machine executable instructions such as those implemented by at least block 305, 405 of FIG. 3. In some examples, the input identifier circuitry 202 may be instantiated by hardware logic circuitry, which may be implemented by an ASIC, XPU, or the FPGA circuitry 1500 of FIG. 15 structured to perform operations corresponding to the machine readable instructions. Additionally or alternatively, the input identifier circuitry 202 may be instantiated by any other combination of hardware, software, and/or firmware. For example, the input identifier circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for controlling allocation. For example, the means for controlling allocation may be implemented by the control allocation determiner circuitry 204. In some examples, the control allocation determiner circuitry 204 may be instantiated by processor circuitry such as the example processor circuitry 1312 of FIG. 13. For instance, control allocation determiner circuitry 204 may be instantiated by the example microprocessor 1400 of FIG. 14 executing machine executable instructions such as those implemented by at least blocks 322, 430 of FIG. 3. In some examples, the control allocation determiner circuitry 204 may be instantiated by hardware logic circuitry, which may be implemented by an ASIC, XPU, or the FPGA circuitry 1500 of FIG. 15 structured to perform operations corresponding to the machine readable instructions. Additionally or alternatively, the control allocation determiner circuitry 204 may be instantiated by any other combination of hardware, software, and/or firmware. For example, the control allocation determiner circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for controlling reallocation. For example, the means for controlling reallocation may be implemented by the control reallocation determiner circuitry 206. In some examples, the control reallocation determiner circuitry 206 may be instantiated by processor circuitry such as the example processor circuitry 1312 of FIG. 13. For instance, control reallocation determiner circuitry 206 may be instantiated by the example microprocessor 1400 of FIG. 14 executing machine executable instructions such as those implemented by at least block 435 of FIG. 4. In some examples, the control reallocation determiner circuitry 206 may be instantiated by hardware logic circuitry, which may be implemented by an ASIC, XPU, or the FPGA circuitry 1500 of FIG. 15 structured to perform operations corresponding to the machine readable instructions. Additionally or alternatively, the control reallocation determiner circuitry 206 may be instantiated by any other combination of hardware, software, and/or firmware. For example, the control reallocation determiner circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for performing actuator command rate limiting and applying a rate of position limit based on actuator capability. For example, the means for performing actuator command rate limiting may be implemented by the actuator command rate and position limiter circuitry 208. In some examples, the actuator command rate and position limiter circuitry 208 may be instantiated by processor circuitry such as the example processor circuitry 1312 of FIG. 13. For instance, actuator command rate and position limiter circuitry 208 may be instantiated by the example microprocessor 1400 of FIG. 14 executing machine executable instructions such as those implemented by at least blocks 330, 445 of FIG. 4. In some examples, the actuator command rate and position limiter circuitry 208 may be instantiated by hardware logic circuitry, which may be implemented by an ASIC, XPU, or the FPGA circuitry 1500 of FIG. 15 structured to perform operations corresponding to the machine readable instructions. Additionally or alternatively, the actuator command rate and position limiter circuitry 208 may be instantiated by any other combination of hardware, software, and/or firmware. For example, the actuator command rate and position limiter circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for determining control power. For example, the means for determining control power may be implemented by the control power determiner circuitry 210. In some examples, the control power determiner circuitry 210 may be instantiated by processor circuitry such as the example processor circuitry 1312 of FIG. 13. For instance, control power determiner circuitry 210 may be instantiated by the example microprocessor 1400 of FIG. 14 executing machine executable instructions such as those implemented by at least blocks 320, 425 of FIG. 4. In some examples, the control power determiner circuitry 210 may be instantiated by hardware logic circuitry, which may be implemented by an ASIC, XPU, or the FPGA circuitry 1500 of FIG. 15 structured to perform operations corresponding to the machine readable instructions. Additionally or alternatively, the control power determiner circuitry 210 may be instantiated by any other combination of hardware, software, and/or firmware. For example, the control power determiner circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for identifying an error. For example, the means for identifying an error may be implemented by the error identifier circuitry 212. In some examples, the error identifier circuitry 212 may be instantiated by processor circuitry such as the example processor circuitry 1312 of FIG. 13. For instance, error identifier circuitry 212 may be instantiated by the example microprocessor 1400 of FIG. 14 executing machine executable instructions such as those implemented by at least block 428 of FIG. 4. In some examples, the error identifier circuitry 212 may be instantiated by hardware logic circuitry, which may be implemented by an ASIC, XPU, or the FPGA circuitry 1500 of FIG. 15 structured to perform operations corresponding to the machine readable instructions. Additionally or alternatively, the error identifier circuitry 212 may be instantiated by any other combination of hardware, software, and/or firmware. For example, the error identifier circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for applying a filter. For example, the means for applying a filter may be implemented by the filter applier circuitry 214. In some examples, the filter applier circuitry 214 may be instantiated by processor circuitry such as the example processor circuitry 1312 of FIG. 13. For instance, filter applier circuitry 214 may be instantiated by the example microprocessor 1400 of FIG. 14 executing machine executable instructions such as those implemented by at least blocks 415, 420 of FIG. 4. In some examples, the filter applier circuitry 214 may be instantiated by hardware logic circuitry, which may be implemented by an ASIC, XPU, or the FPGA circuitry 1500 of FIG. 15 structured to perform operations corresponding to the machine readable instructions. Additionally or alternatively, the filter applier circuitry 214 may be instantiated by any other combination of hardware, software, and/or firmware. For example, the filter applier circuitry 214 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for generating an output. For example, the means for generating an output may be implemented by the output generator circuitry 216. In some examples, the output generator circuitry 216 may be instantiated by processor circuitry such as the example processor circuitry 1312 of FIG. 13. For instance, output generator circuitry 216 may be instantiated by the example microprocessor 1400 of FIG. 14 executing machine executable instructions such as those implemented by at least block 335, 450 of FIG. 3. In some examples, the output generator circuitry 216 may be instantiated by hardware logic circuitry, which may be implemented by an ASIC, XPU, or the FPGA circuitry 1500 of FIG. 15 structured to perform operations corresponding to the machine readable instructions. Additionally or alternatively, the output generator circuitry 216 may be instantiated by any other combination of hardware, software, and/or firmware. For example, the output generator circuitry 216 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the actuator control regulator circuitry 120 of FIG. 1 is illustrated in FIG. 2, one or more of the elements, processes and/or devices illustrated in FIG. 2 may be combined, divided, re-arranged, omitted, eliminated and/or implemented in any other way. Further, the example input identifier circuitry 202, the example control allocation determiner circuitry 204, the example control reallocation determiner circuitry 206, the example actuator command rate and position limiter circuitry 208, the example control power determiner circuitry 210, the example error identifier circuitry 212, the example filter applier circuitry 214, the example output generator circuitry 216, and/or, more generally, the example actuator control regulator circuitry 120 of FIG. 2 may be implemented by hardware, software, firmware and/or any combination of hardware, software and/or firmware. Thus, for example, any of the example input identifier circuitry 202, the example control allocation determiner circuitry 204, the example control reallocation determiner circuitry 206, the example actuator command rate and position limiter circuitry 208, the example control power determiner circuitry 210, the example error identifier circuitry 212, the example filter applier circuitry 214, the example output generator circuitry 216, and/or, more generally, the example actuator control regulator circuitry 120 of FIG. 2 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example actuator control regulator circuitry 120 of FIG. 2 may include one or more elements, processes, and/or devices in addition to, or instead of, those illustrated in FIG. 2, and/or may include more than one of any or all of the illustrated elements, processes and devices.

Figure 3:
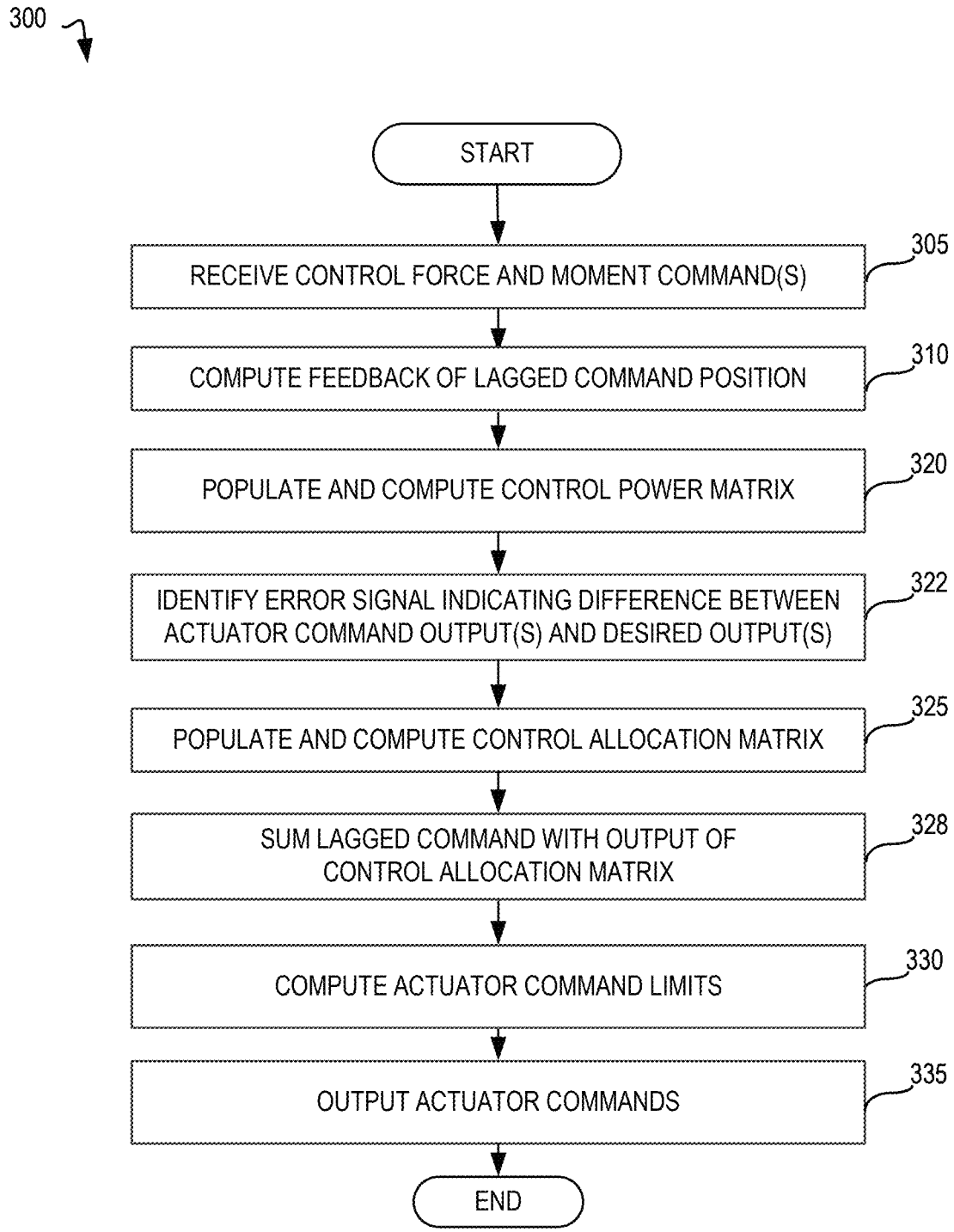
FIG. 3 is a flowchart representative of example machine-readable instructions and/or example operations that may be executed, instantiated, and/or performed by example programmable circuitry to implement the example actuator control regulator circuitry of FIG. 2.
Figure 4:
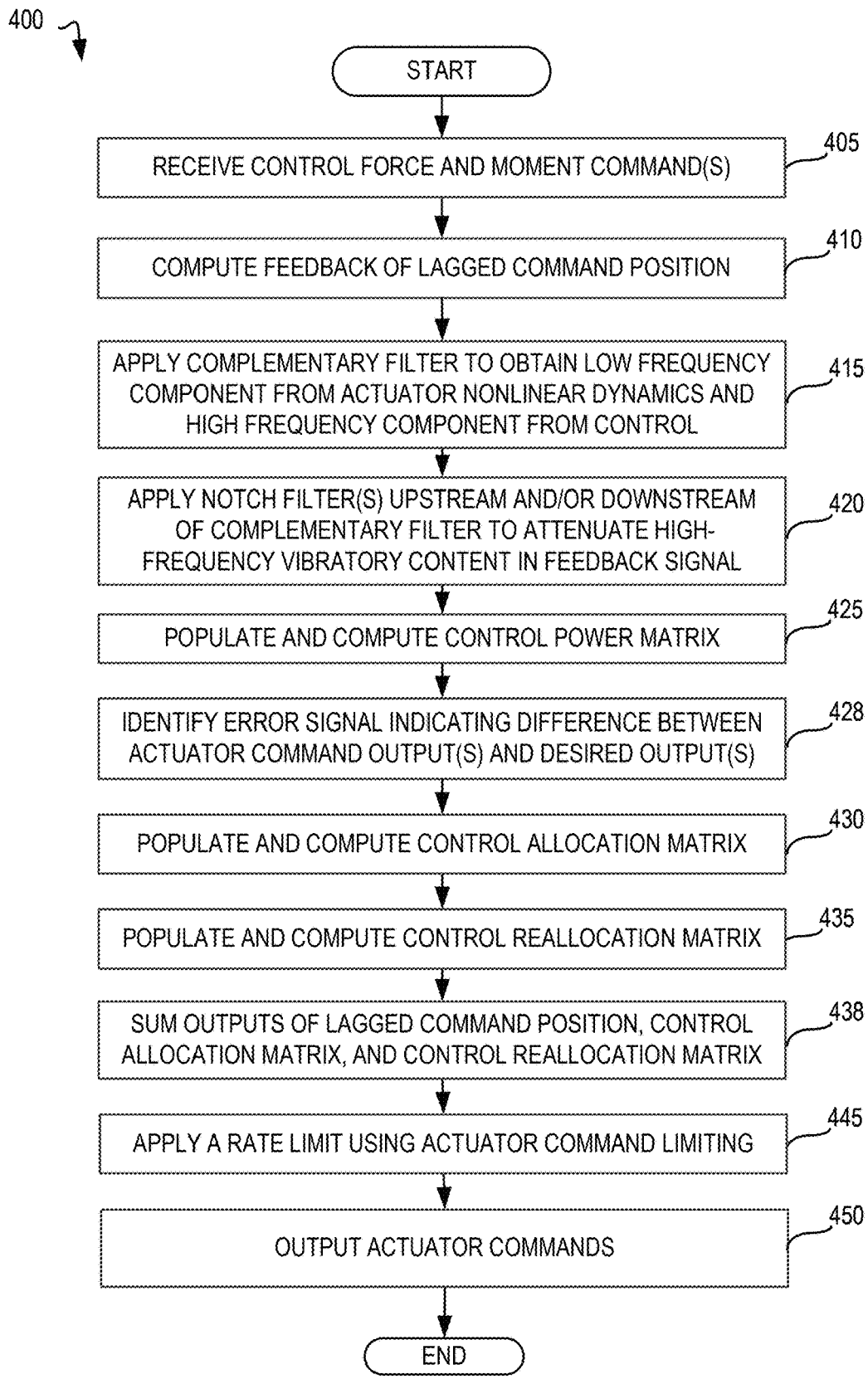
FIG. 4 is a flowchart representative of example machine-readable instructions and/or example operations that may be executed, instantiated, and/or performed by example programmable circuitry to implement the example actuator control regulator circuitry of FIG. 2 to apply actuator position feedback and/or equalization as part of reallocation of output command(s).

Flowcharts representative of example machine readable instructions, which may be executed to configure processor circuitry to implement actuator control regulator circuitry 120 of FIG. 2 are shown in FIGS. 3-4. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 14 and/or 15. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 3-4, many other methods of implementing the actuator control regulator circuitry 120 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3-4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine-readable instructions and/or operations 300 which may be executed and/or instantiated by processor circuitry to implement the example actuator control regulator circuitry 120 of FIG. 2. The machine readable instructions and/or the operations 300 of FIG. 3 begin at block 305, at which the input identifier circuitry 202 receives control force and moment command(s). In the example of FIG. 3, the actuator command rate and position limiter circuitry 208 computes feedback of a lagged position command based on the actuator performance, at block 310. In some examples, the output generator circuitry 216 identifies a lag based on an error signal (e.g., when a difference between the actuator command output(s) and the control force and moment command(s) inputs). As such, a feedback loop forms to include the lagged position command in the initial command, as shown in more detail in connection with FIG. 6A. Once the error identifier circuitry 212 does not detect an error (e.g., the predicted force/moments generated by actuator command output(s) match the control force and moment command(s)), the reassignment of control to the remaining actuator(s) is achieved. The control power determiner circuitry 210 populates a control power matrix to account for the lag based on the lagged position identified using the actuator command rate and position limiter circuitry 208, at block 320. The error identifier circuitry 212 identifies the presence of an error signal indicating a difference between predicted force/moment outputs generated by actuator output(s) and control force and moment command input(s), at block 322. The control allocation determiner circuitry 204 proceeds to populate a control allocation matrix, at block 325. Furthermore, the control allocation determiner circuitry 204 sums lagged command output with the output of the control allocation matrix, at block 328. For example, as described in more detail in connection with FIGS. 6A, 6B, and/or 7, the control allocation matrix commands all the available actuators (e.g., associated with an over-actuated vehicle). The control allocation determiner circuitry 204 outputs the control allocation information to the actuator command rate and position limiter circuitry 208. The actuator command rate and position limiter circuitry 208 applies a rate limit using actuator command limiting to preserve the vehicle's flight control trajectory (e.g., by providing position and rate limits on the actuators), at block 330. For example, the actuator command rate and position limiter circuitry 208 performs rate limiting to maintain pitch roll yaw thrust commands in the same proportion, as described in more detail in connection with FIG. 12. For example, commands for all the actuators available can be scaled back by the same amount to maintain a given flight trajectory even when one of the actuators saturates a rate or position limit. In the example of FIG. 3, the output generator circuitry 216 outputs the actuator commands, at block 335.

Figure 7:
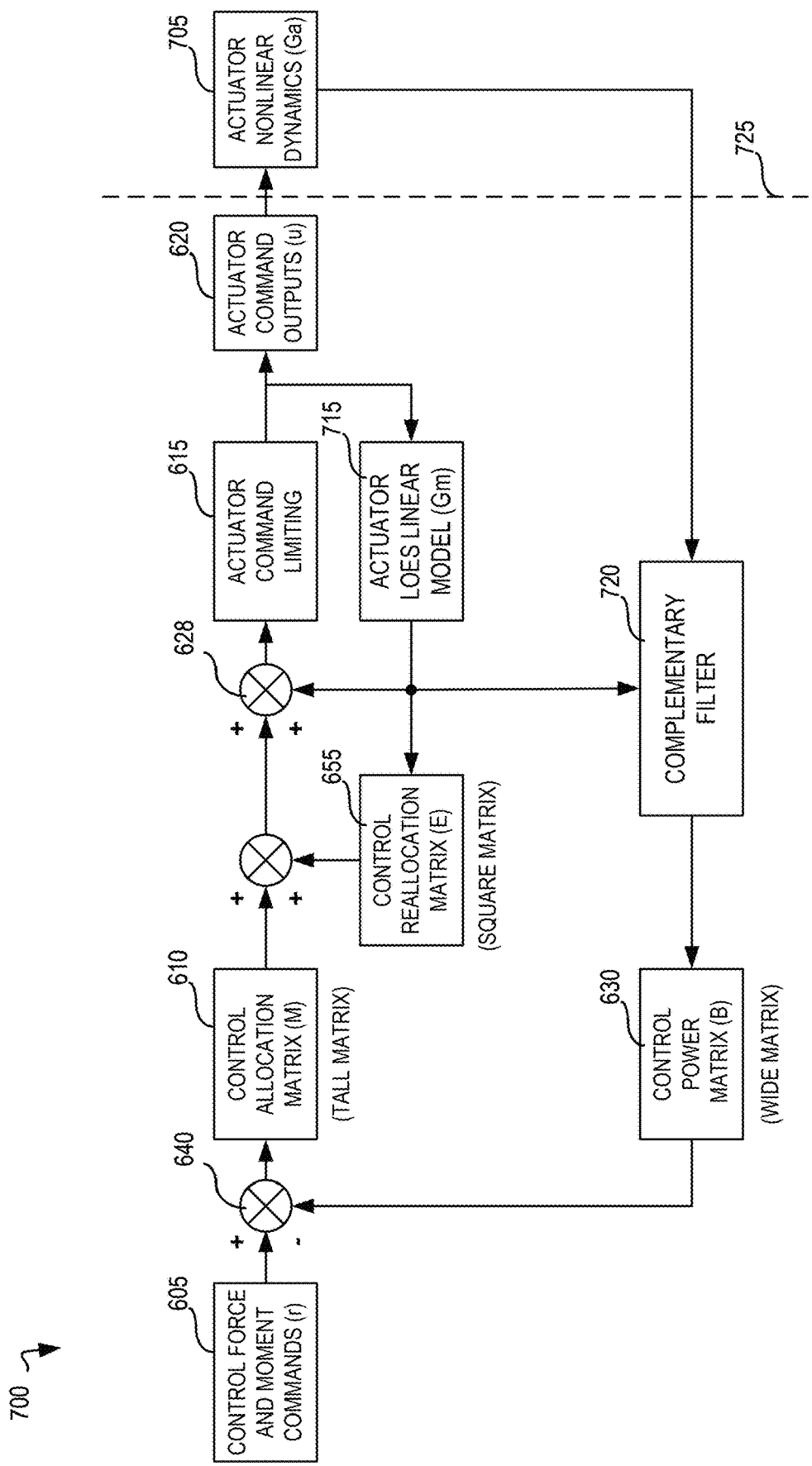
FIG. 7 illustrates an example diagram including the control reallocation matrix and a complementary filter.

FIG. 4 is a flowchart 400 representative of example machine-readable instructions and/or operations which may be executed and/or instantiated by processor circuitry to implement the example actuator control regulator circuitry 120 of FIG. 2 to apply actuator position feedback and/or equalization as part of the reallocation of input command(s) and actuator command outputs described in connection with FIG. 3. The machine readable instructions and/or the operations 300 of FIG. 3 begin at block 405, at which the input identifier circuitry 202 receives control force and moment command(s). Subsequently, the actuator command rate and position limiter circuitry 208 computes feedback of a lagged position command based on the actuator performance, at block 410, as described in connection with FIG. 3. In some examples, the filter applier circuitry 214 applies a complementary filter to obtain low frequency component(s) from actuator nonlinear dynamics output and high frequency component(s) from low-fidelity actuator model estimates, at block 415. As shown in the example of FIG. 7, the complementary filter can be positioned upstream of the actuator nonlinear dynamics and downstream of the control power matrix. In some examples, the filter applier circuitry 214 determines high-frequency vibratory content in the feedback signal and applies a notch filter upstream and/or downstream of the complementary filter to attenuate high-frequency vibratory content in the feedback signal, at block 420. Once the signal is filtered, the control power determiner circuitry 210 populates the control power matrix, at block 425. As described in connection with FIG. 3, the error identifier circuitry 212 identifies the presence of an error signal indicating a difference between predicted force/moment outputs generated by actuator output(s) and control force and moment command input(s), at block 428. The control allocation determiner circuitry 204 proceeds to populate the control allocation matrix, at block 430.

In the example of FIG. 4, the control reallocation determiner circuitry 206 populates a control reallocation matrix, at block 435. For example, as shown in connection with FIG. 6B, the control reallocation determiner circuitry 206 reallocates control in a reactionless manner such that there is no effect on force/moment outputs (e.g., roll, pitch, yaw moment(s), accelerations in the body axis, etc.) and/or to satisfy any objective function (e.g., minimum drag, minimum structural load, minimum actuator load, battery equalization, etc.). As such, the control reallocation determiner circuitry 206 can equalize actuator position(s) to an objective function to reallocate control. The control reallocation determiner circuitry 206 also sums outputs of the lagged command position, the control allocation matrix, and the control reallocation matrix, at block 438. Similarly, the actuator command rate and position limiter circuitry 208 applies a rate limit using actuator command limiting, at block 445. Once the output generator circuitry 216 identifies that no further reassignment of control to other actuator(s) is needed, deviations are eliminated from the commanded flight path caused by control effector deviations and/or saturations. As such, the output generator circuitry 216 outputs the output actuator commands based on the adjusted control allocation to the actuator(s) of a given over-actuated vehicle, such as the aircraft 100 of FIG. 1.

Figure 5:
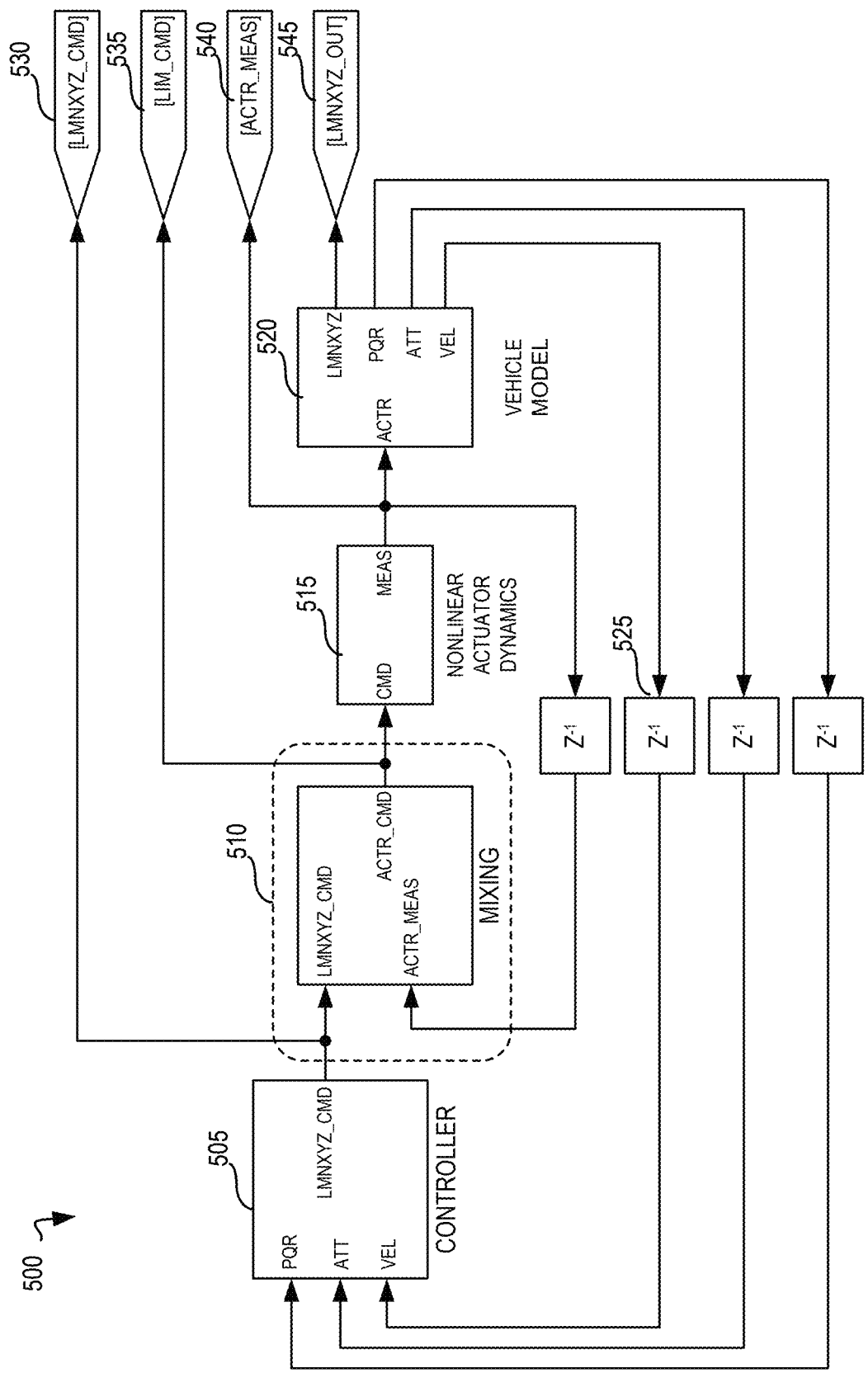
FIG. 5 illustrates an example aircraft simulation model.

FIG. 5 illustrates an example aircraft simulation model 500. The aircraft simulation model 500 includes an example controller block 505, an example mixing block 510, an example nonlinear actuator dynamics block 515, and an example vehicle model block 520. Methods and apparatus disclosed herein focus on the mixing block 510 of the aircraft simulation model 500. In the example of FIG. 5, measured actuator positions are received and fed back into the mixing block 510 to reallocate control when an actuator fails to follow a command. As such, any errors in actuator performance are compensated for before such errors result in attitude (att), velocity (vel), and/or roll, pitch, yaw rate (pqr) errors (e.g., as determined using example block(s) 525). For example, errors in one actuator can be mitigated by adjusting the performance of the remaining actuators. In the example of FIG. 5, output(s) 530, 535, 540, 545 include LMNXYZ command output 530 (e.g., roll, pitch, yaw moment(s), accelerations in the body axis, etc.), limiting command output 535, actuator measurement output 540, and/or LMNXYZ output 540.

FIG. 6A illustrates an example diagram 600 without actuator position feedback or equalization, where feedback automatically reallocates control to other actuators when a limit is impinged on one or more actuators. In the example of FIG. 6A, control force and moment commands (r) 605 are received by the control allocation matrix (M) 610, which commands all the available actuators. Output from the control allocation matrix (M) 610 passes to the actuator command limiting 615, which provides position and rate limits on the actuators. The actuator command limiting 615 performs rate limiting on all available actuators such the that pitch roll yaw thrust commands remain in the same proportion but with reduced output. In some examples, the actuator command limiting 615 outputs example actuator command output(s) (u) 620. Once the actuator limited commands are determined, an example feedback loop 622 forms (e.g., based on a determined lag 625) to add the lagged position command back to the initial command at operator 628. In the example of FIG. 6A, a control power matrix (B) 630 outputs an error signal, such that any error in the determined control forces and moments feeds back to operator 640 to determine a lag. The control allocation matrix (M) 610 reassigns control based on the determined lag. The feedback loop and control allocation reassignment continues until the predicted force/moments generated by actuator command output(s) 620 match the control force and moment command(s) 605. As such, control can be reallocated to other actuators to achieve the desired control force and moment commands input.

In examples disclosed herein, Equation 1 is applied to determine a time derivative of an actuator position commands vector ($\dot{u}$):

$$\dot{u} = M\dot{r} + \dot{\delta} + \omega(M(r - Bu) + \delta) \qquad \text{Equation 1}$$

In the example of Equation 1, M represents the control allocation matrix 610 used to mix or map commanded forces and moment(s) (r) to control position commands. The elements of M can be functions of airspeed, air density, etc. In the example of Equation 1, $\dot{r}$ is the time derivative of the commanded forces and moments vector (r), $\dot{\delta}$ is the time derivative of the error vector introduced by saturation in actuator command limiting 615, $\omega$ is a gain governing the bandwidth of control reallocation, r represents the commanded forces and moments vector, B is the control power matrix 630 used to estimate forces and moments generated by control positions, u represents the actuator position commands vector (e.g., actuator command outputs 620), and $\delta$ is a force/moment error vector introduced by saturation in the actuator command limiting 615. In over-actuated systems having redundant control effectors, there are multiple vectors u that can satisfy r=Bu. In the example of Equation 1, integrator terms command the time derivative of an actuator position commands vector with a gain w (e.g., until delta is 0 and r−Bu=0). In the example of Equation 1, delta does not encounter open-loop integrator wind-up issues given that the architecture feeds back lag of the limited command, as shown in the example of FIG. 6A. As such, with no errors introduced by actuator command limiting and with Bu=r by design, Equation 1 can be reduced to $\dot{u}$=M$\dot{r}$, where integration results in u=Mr+C, such that C is the potential for stored actuator command bias, which exists due to trim being stored on actuators. Any combination of actuators satisfying Mr=B*mu is valid and C is governed by the addition of a control reallocation matrix (E), as shown in connection with FIG. 6B.

FIG. 6B illustrates an example diagram 650 including a control reallocation matrix 655 to equalize actuator positions to an objective function. In the example of FIG. 6B, the control reallocation matrix (E) 655 reallocates control in a reactionless manner (e.g., designed to have no effect on the Bu component of Equation 1). In some examples, the control reallocation matrix (E) 655 can be represented as follows: E=k*(Mtrim*B−I), where Mtrim defines a trim allocation matrix (e.g., an objective function) in steady state and does not need to match the control allocation matrix (M) 610.

Furthermore, the actuator rate commands vector (u) can be determined in accordance with Equation 2, based on the availability of the control reallocation matrix (E), as previously described in connection with Equation 1:

$$\dot{u} = M\dot{r} + \dot{\delta} + \omega(M(r - Bu) + \delta + Eu) \qquad \text{Equation 2}$$

In some examples, the control reallocation matrix (E) 655 reallocates control in a reactionless manner such that there is no effect on L, M, N, X, Y, and/or Z predicted outputs generated by actuator commands (e.g., (e.g., roll, pitch, yaw moment(s), accelerations in the body axis, etc.). Likewise, the control reallocation matrix (E) 655 has no effect on output of the control power matrix (B) 630 (e.g., B*u). In examples disclosed herein, the trim allocation matrix (Mtrim) can satisfy any objective function (e.g., minimum drag, minimum structural load, minimum actuator load, battery equalization, etc.).

FIG. 7 illustrates an example diagram 700 including the control reallocation matrix 655 and a complementary filter 720 to feedback measured or high fidelity estimated actuator position(s). The example of FIG. 7 also includes actuator nonlinear dynamics 705, control output(s) 710, and an actuator Low Order Equivalent System (LOES) linear model 715, in addition to the complementary filter 720. In the example of FIG. 7, the complementary filter 720 is added to feedback measured actuator position(s). As previously described, the actuator command limiting 615 applies authority and rate limits to preserve the control trajectory for coupled actuators by slowing all coupled actuators by the same scale factor as a critical actuator. In the example of FIG. 7, feeding back lagged commands produces the transfer function (s+ω)/s described in connection with FIG. 9A, where the actuator command limiting 615 and the actuator LOES linear model 715 are involved in the identification of the lagged command. For example, an actuator LOES linear model 715 identified lag (e.g., linear model component Gm) is tuned to be a lower-order equivalent of the actuator nonlinear dynamics 705 (e.g., actuator nonlinear dynamics component Ga), where Ga has a higher order than Gm with uncertainties at high frequency. In the example of FIG. 7, the actuator nonlinear dynamics 705 is an external device as shown by an external/internal system identifier 725. As such, the actuator nonlinear dynamics component Ga is an input received externally by the complementary filter 720. In some examples, nonlinear elements associated with the actuator nonlinear dynamics 705 can include acceleration limits, velocity limits, and/or position limits. In some examples, the actuator nonlinear dynamics 705 receives a position command and measures a control actuator position and uses the identified position to form a closed loop feedback.

In the example of FIG. 7, the complementary filter 720 uses Gm for high frequency and Ga for low frequency, because using measured Ga output enables automatic control reallocation without needing discrete fault logic and enables fault monitors to take more time isolating a real fault while reducing the frequency of false-positive nuisance faults. For example, the complementary filter 720 feeds back a combination of the high frequency (Gm) component and low frequency (Ga) component, which forms a unity gain transfer function and is received at the control power matrix 630. In some examples, a low-pass filter on measured Ga mitigates feedback of noise and vibratory content. In examples disclosed herein, notch filters can be installed upstream or downstream of the complementary filter as needed to attenuate high-frequency vibratory content in the feedback signal.

Figure 8A:
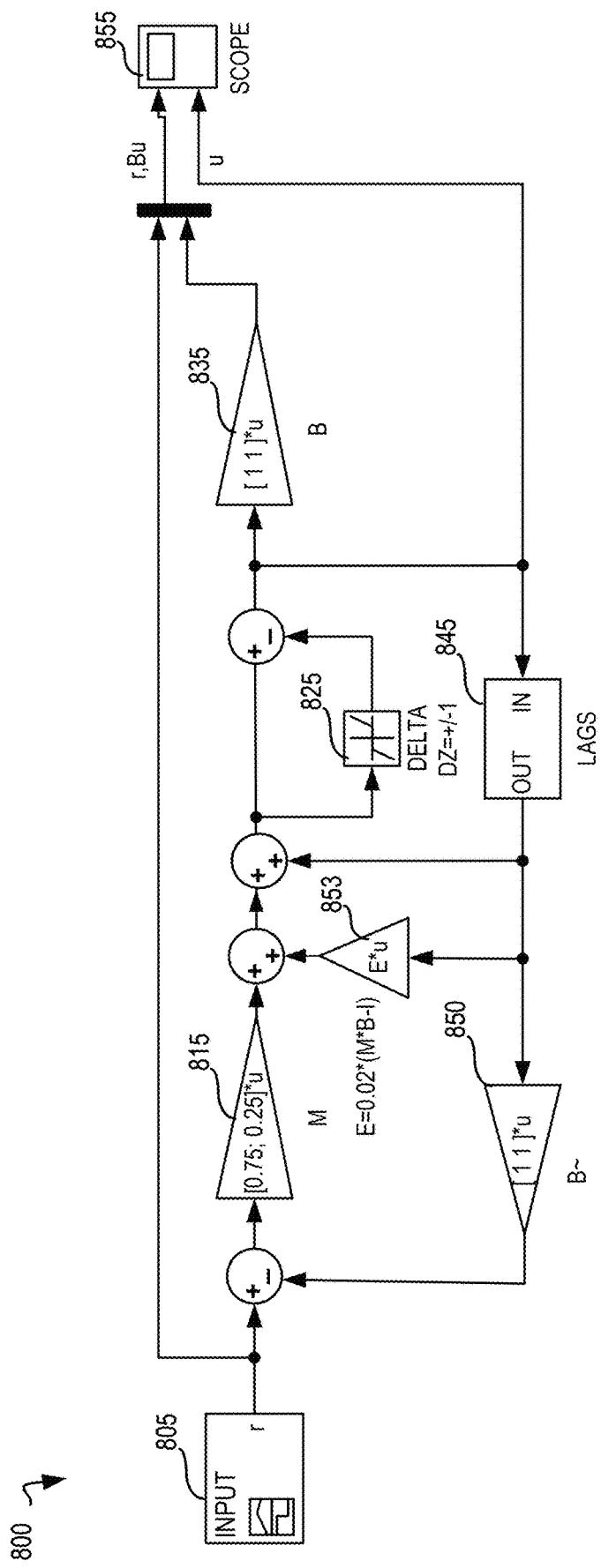
FIG. 8A illustrates an example simulation model with a single input associated with a first actuator and a second actuator.

FIG. 8A illustrates an example simulation model 800 with a single input associated with a first actuator and a second actuator. FIG. 8A shows an example execution of the diagram 600 of FIG. 6B, where the control allocation matrix 610 values and lag 625 values are selected. In the example of FIG. 8A, two actuators share the load, such that there is no lag until one of the actuators reaches a limit. FIG. 8A includes input data 805, control allocation matrix (M) data 815, delta calculation 825, control power matrix (B) data 835, lag data 845, control power matrix approximation (B~) data 850, control reallocation matrix (E) 853, and output 855. In the example of FIG. 8, the variables B, r, Bu, and u are shown, where B is the control power matrix 630 used to estimate forces and moments from control positions, u represents the actuator position commands vector (e.g., actuator command outputs 620), r represents the commanded forces and moments vector, and Bu represents the forces and/or moments generated by u.

Figure 8B:
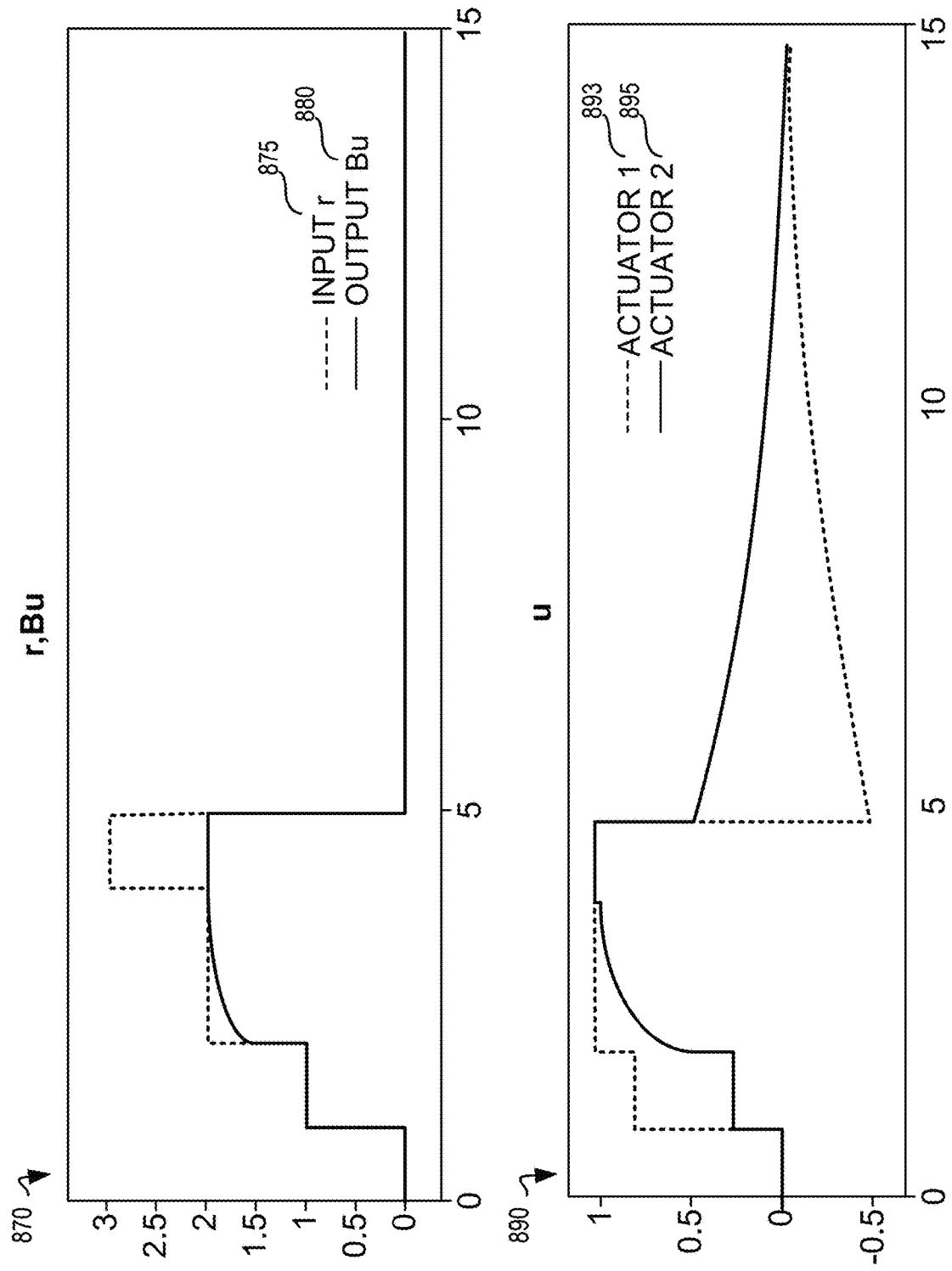
FIG. 8B illustrates an example graphical representation of an example input representing a commanded forces and moments vector (r) and an example output representing a control effectiveness matrix (B) with an actuator position commands vector (u) for the first actuator and the second actuator of FIG. 8A.

FIG. 8B illustrates example graphical representations 870, 890 of an example input representing a commanded forces and moments vector (r) input 875 and an example output representing a control effectiveness matrix (B) with an actuator position commands vector (u) output 880 for a first actuator 893 and a second actuator 895 of FIG. 8A. A step response is shown in the graphical representations 870, 890 with no lag occurring until one of the actuators hits a limit (e.g., saturation). As shown, the command input increases stepwise, such that the first actuator 893 hits a limit of 1. The second actuator 895 adjusts to allow the control output to match the command input. For example, an initial step response occurs with no lag (e.g., no saturation), such that Bu=r. In examples disclosed herein, a control reallocation matrix (E) is added to correct for a difference in u between the first actuator 893 and a second actuator 895, as explained in more detail in connection with FIG. 7.

Figure 9A:
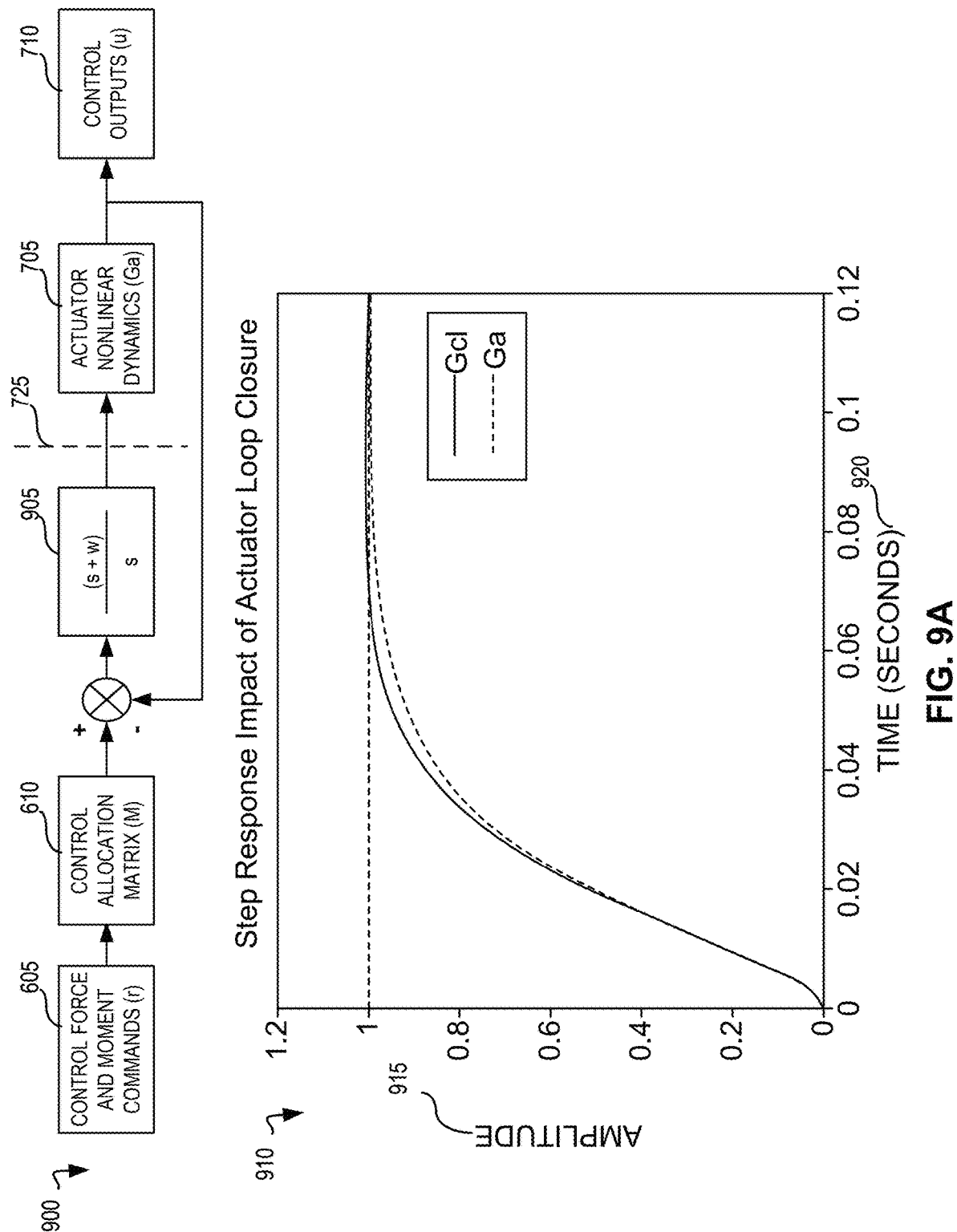
FIG. 9A illustrates an example rearrangement and an example effect of an additional actuator position loop closure on system step response when actuator dynamics (Ga) is a higher order than the Low Order Equivalent System (LOES) model.

FIG. 9A illustrates an example rearrangement and an example effect of an additional actuator position loop closure on system step response when actuator dynamics (Ga) is a higher order than the Low Order Equivalent System (LOES) model. In the example of FIG. 9A, a LOES linear dynamics approximation is shown, illustrating the selection of the gain (w) such that a closed loop forms where Gcl=u/r approximates the actuator nonlinear dynamics component Ga. An example closed loop 900 of FIG. 9A includes the control force and moment commands 605, the control allocation matrix 610, the actuator nonlinear dynamics 705, control output(s) 710, and an example lag determination 905. An example graphical representation 910 shows a step response impact of an actuator loop closure, where a change in example amplitude 915 is shown over example time 920.

Figure 9B:
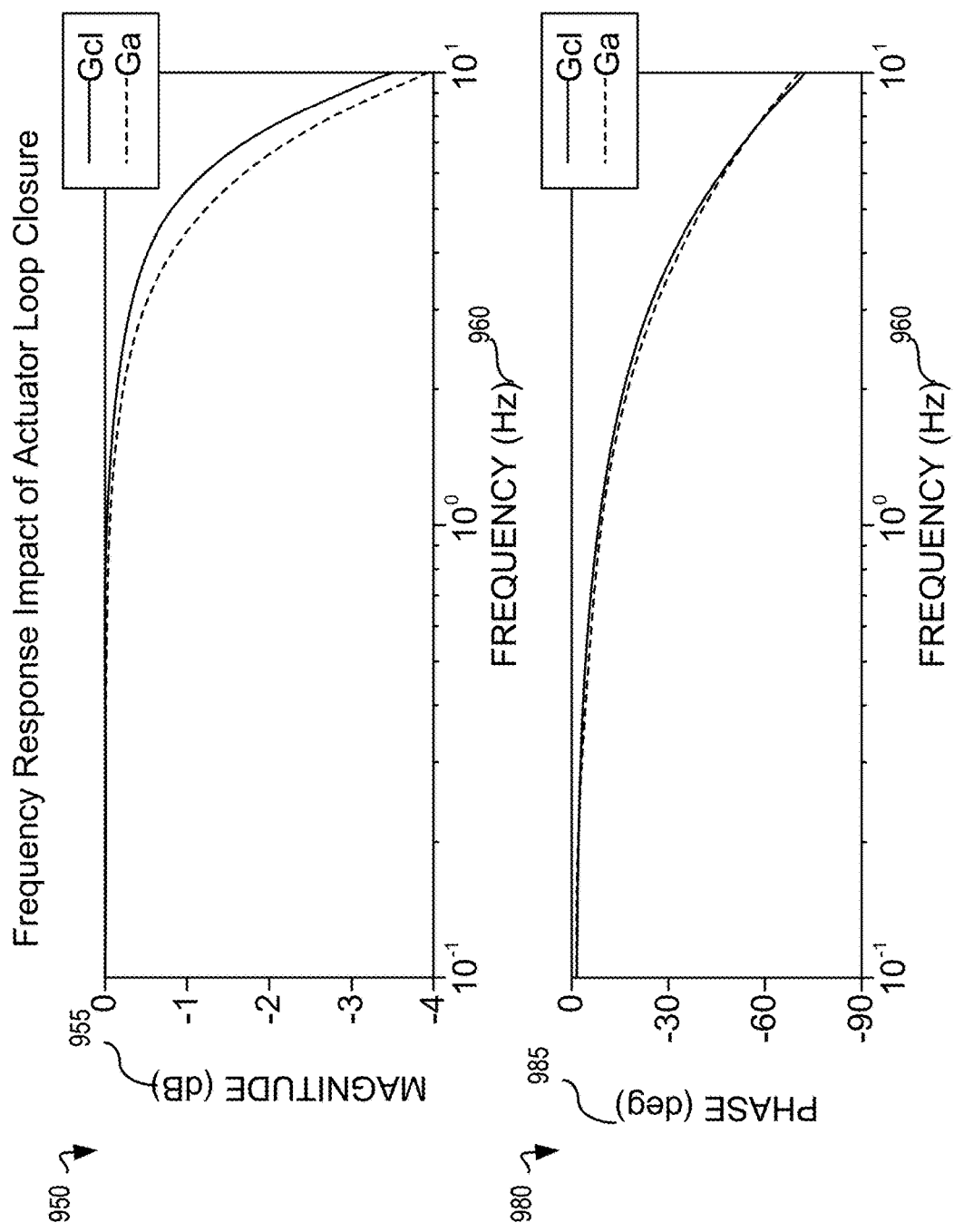
FIG. 9B illustrates an example effect of an additional actuator position loop closure on frequency response for the system of FIG. 9A.

FIG. 9B illustrates an example effect of an additional actuator position loop closure on frequency response for the system of FIG. 9A. For example, FIG. 9B shows a graphical representation 950 of a change in magnitude 955 with increasing frequency (Hz) 960 and the graphical representation 980 of a change in phase 985 (in degrees) with increasing frequency (Hz) 960. Overall, the Gcl component results in a better phase than the Ga component when comparing the phase margin frequency bands.

Figure 10:
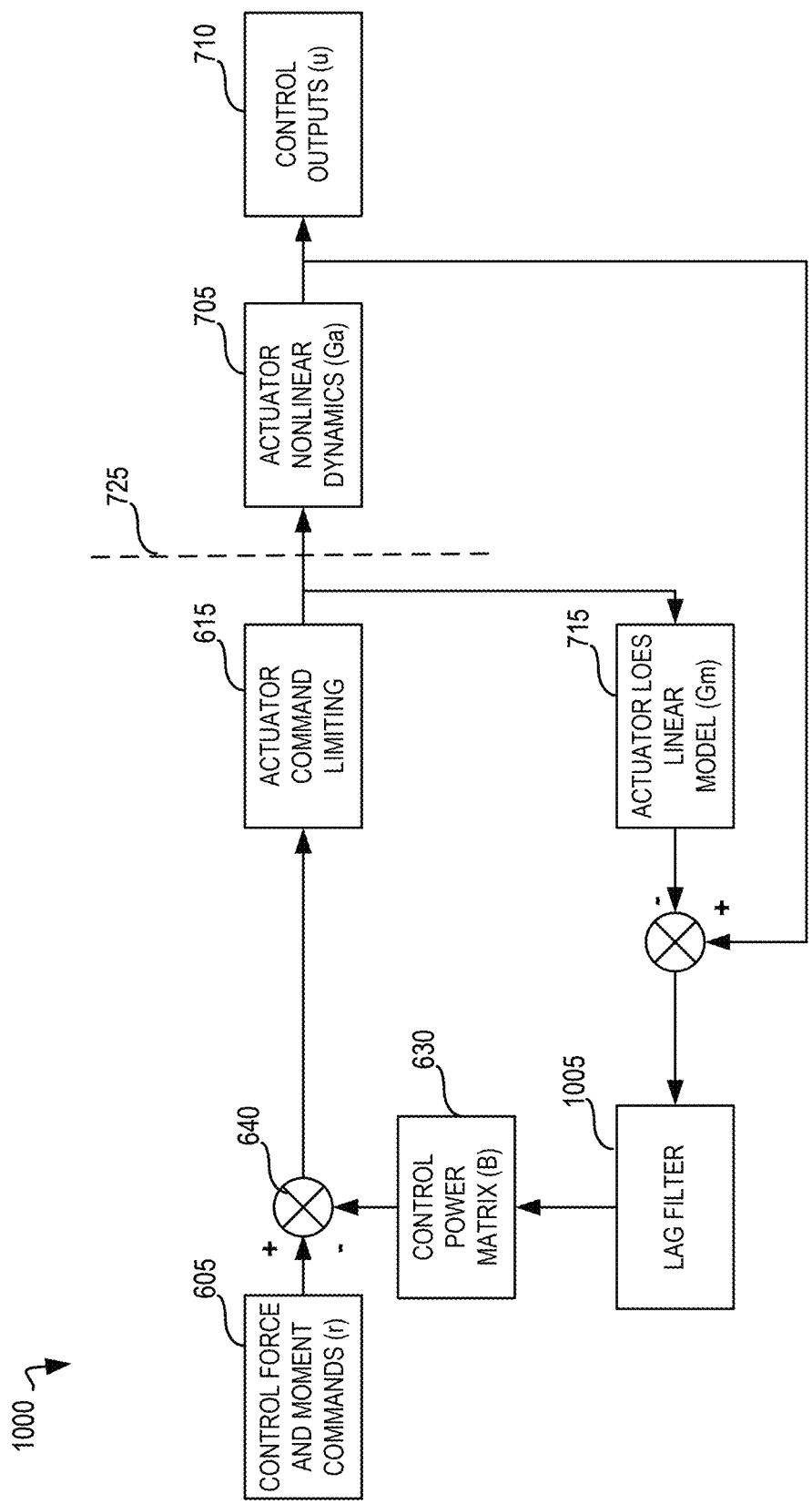
FIG. 10 illustrates an example rearrangement for assessment using linear analysis.

FIG. 10 illustrates an example alternative arrangement 1000 for assessment using linear analysis. For example, FIG. 10 presents an alternative arrangement to that shown and described in connection with FIGS. 6A, 6B, and/or 7. For example, the alternative arrangement 1000 includes the control force and moment commands input 605, the actuator command limiting 615, the control power matrix 630, the actuator nonlinear dynamics 705, the control outputs 710, the actuator LOES linear model 715, and a lag filter 1005. In the example of FIG. 10, the lag filter 1005 is positioned to receive output(s) from the actuator linear model 715 and the control output(s) 710, an arrangement that can be helpful for purposes of linear analysis.

Figure 11:
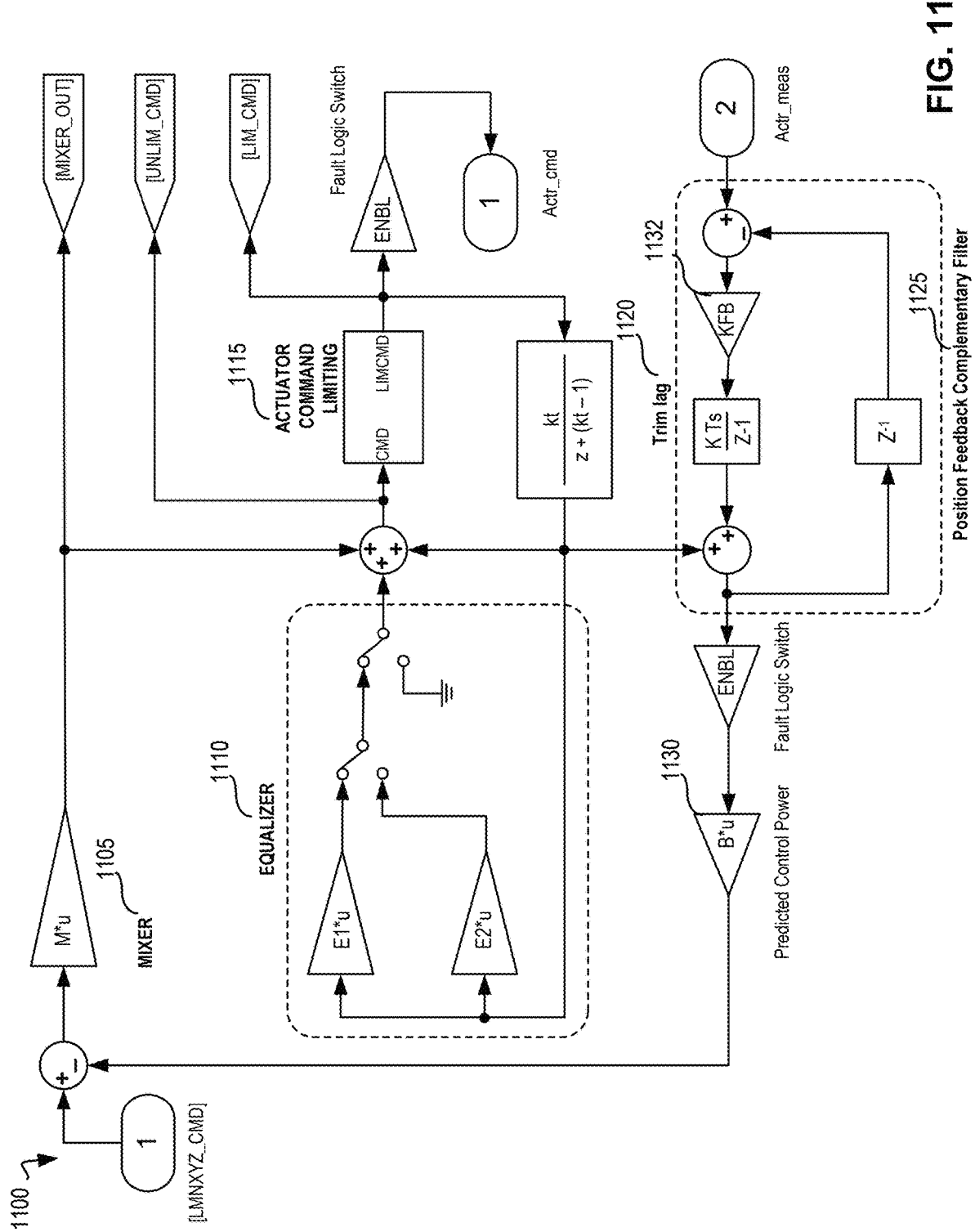
FIG. 11 illustrates an example equalizer, actuator model, complementary filter, and actuator measurements.

FIG. 11 illustrates an example model 1100 including an equalizer, an actuator model, and a complementary filter. For example, the simulation model 1100 includes the control loop components described in connection with FIG. 7, including a mixer 1105, an equalizer 1110, actuator command limiting 1115, trim lag 1120, a position feedback complementary filter 1125, and a predicted control power matrix 1130. In the example of FIG. 11, the predicted control power matrix (B) 1130 can be set to match the flight simulation model, the mixer (M) 1105 can be set to the desired control allocation matrix (e.g., verifying that B*M=I), the equalizer 1110 (e.g., E trim allocation matrices) can be set for various objective functions (e.g., verifying that each B*E matrix is populated with zeros). In some examples, the position feedback complementary filter 1125 includes receiving example input (kfb) 1132, such that the kfb input 1132 is set to attenuate actuator feedback noise and vibrations into commands, where larger values are desirable for transient mitigation (e.g., kfb>10). Furthermore, in the example of the trim lag 1120, the variables kt can be set to approximate the actuator nonlinear dynamics component (Ga) frequency response while minimizing overshoot and undershoot in the step response of the linearized model.

Figure 12:
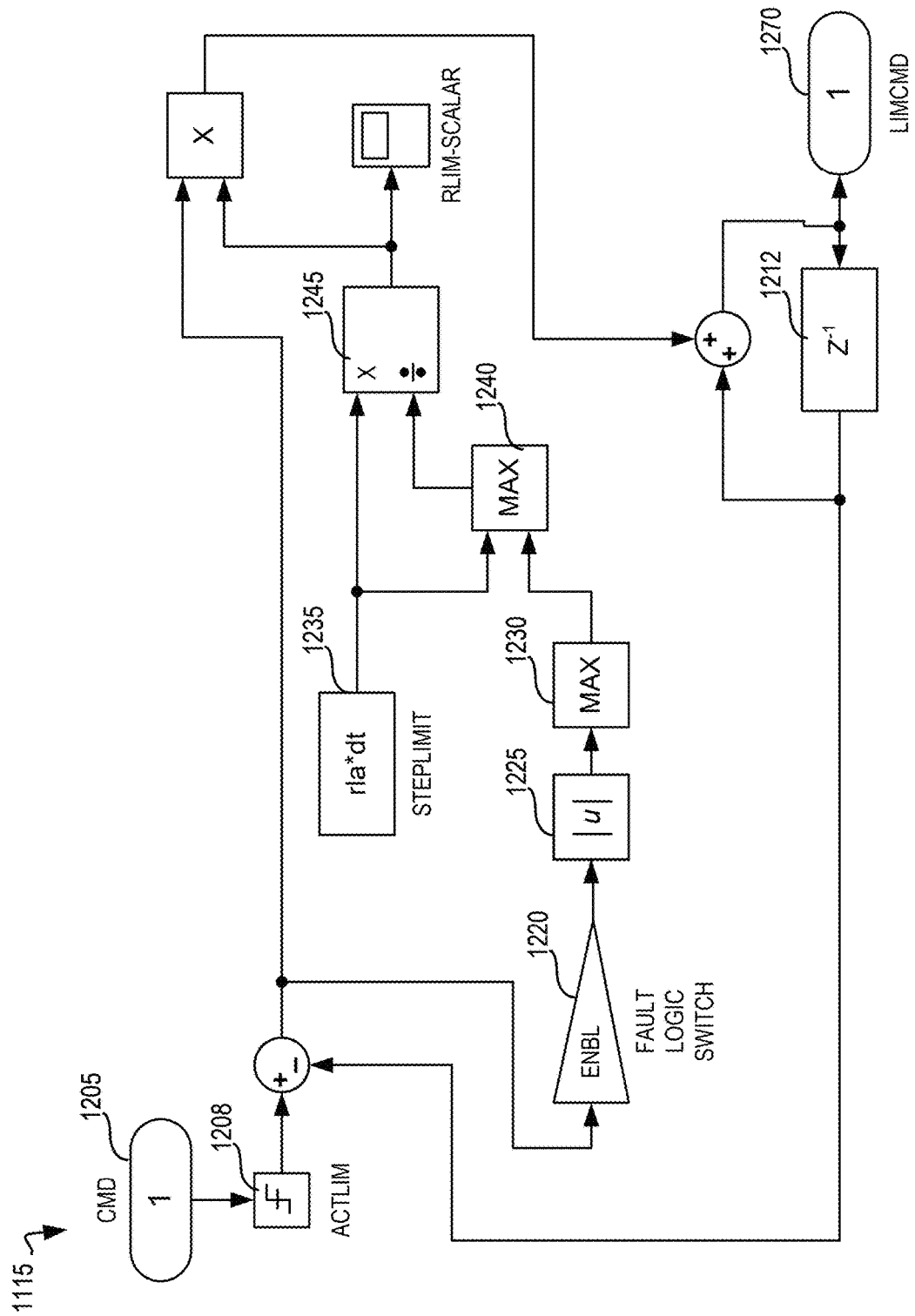
FIG. 12 illustrates an example rate and position limiter which slows all actuators by the same scalar such that critical actuator rate and position limits and the commanded control trajectory remain unchanged.

FIG. 12 illustrates actuator command limiting 1115 of FIG. 11. For example, the actuator command limiting 1115 slows all actuators by the same scalar such that the commanded control trajectory remains unchanged as the critical actuator rate limits are impinged. Given that the actuator command limiting 1115 is located downstream of the mixer 1105 of FIG. 11, the actuator command limiting 1115 weights commands in all axes equally. In some examples, actuator command limiting 1115 can be added upstream of mixing for less-critical axes (e.g., such as yaw) to preserve actuator capability for other more critical axes. However, any other type of actuator command limiting can be used, depending on the type of over-actuated vehicle (e.g., a more complex design could be used for a tiltrotor in forward flight where thrust (X) is largely decoupled from moments LMN). For example, a command 1205 is input into a rate limiter 1208, where the command is directed to a fault logic switch 1220 after passing through a subtractor block. An absolute value block 1225 identifies the absolute value of the input from the fault logic switch 1220, followed by a first max block 1230 determining a maximum for all the available actuators (e.g., identification of the actuators taking the largest step forward). Given that there is a limit on the step forward that can be taken by the actuator(s) (e.g., step limit 1235), the second max block 1240 determines which whether a rate or position limit is impinged. Subsequently, a divider block 1245 identifies a ratio between the actuator step limit capability and the requested step limit input for the actuator. As such, the commands for all the actuators available are scaled back by the same amount to maintain a given flight trajectory even when one of the actuators saturates a rate or position limit. For example, pitch, roll, and yaw can be impacted by a single actuator hitting its rate limit, which the actuator command limiting 1115 can prevent and/or mitigate. The resulting output from the actuator command limiting 1115 scales back the remaining actuators to maintain the flight trajectory (e.g., using a limiting command output 1270 and the lag 1212).

Figure 13:
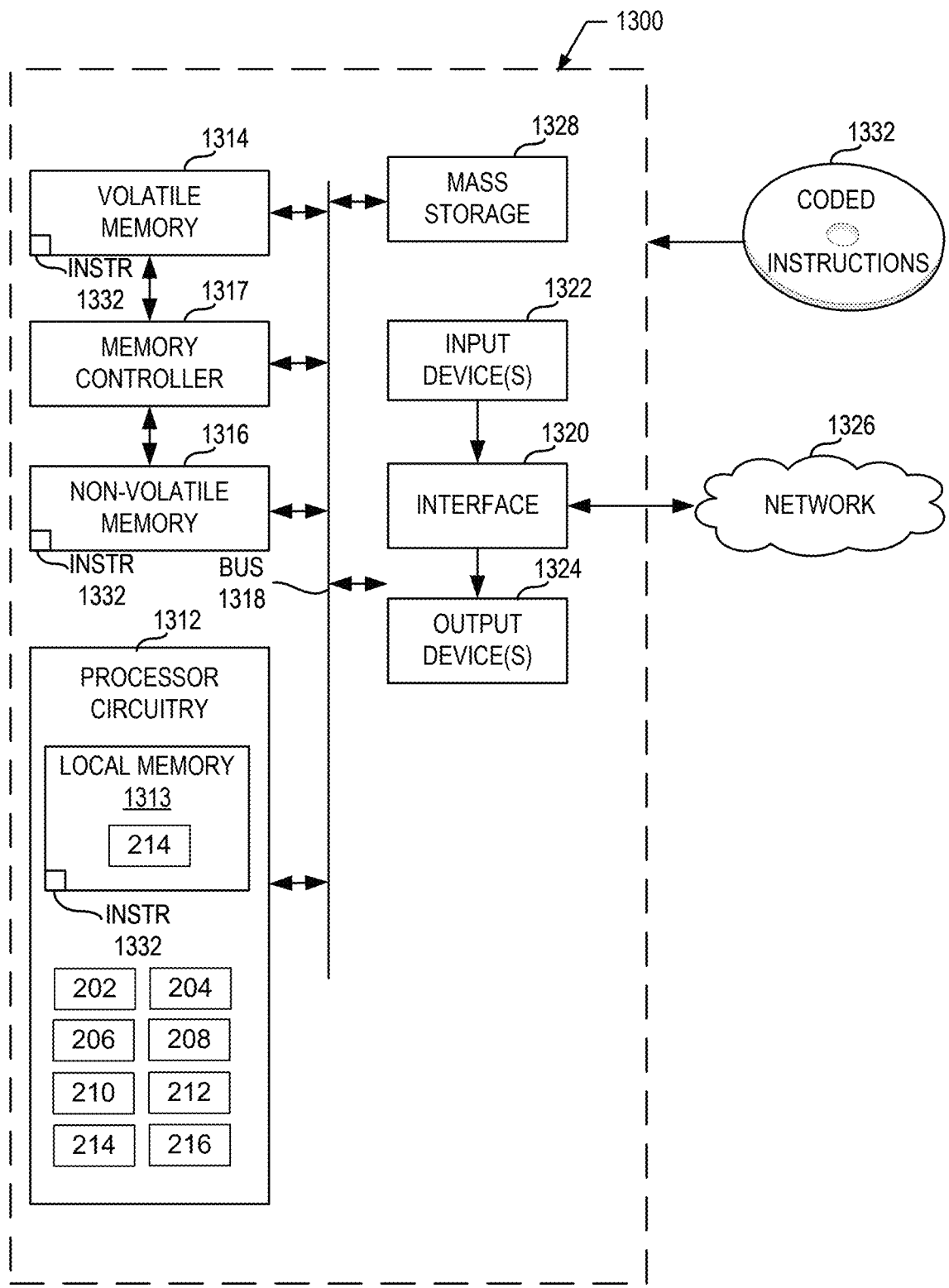
FIG. 13 is a block diagram of an example processing platform including programmable circuitry structured to execute, instantiate, and/or perform the example machine readable instructions and/or perform the example operations of FIGS. 3-4 to implement the actuator control regulator circuitry of FIG. 1.

FIG. 13 is a block diagram of an example programmable circuitry platform 1300 structured to execute and/or instantiate the example machine-readable instructions and/or the example operations of FIGS. 3-4 to implement the example actuator control regulator circuitry 120. The programmable circuitry platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1300 of the illustrated example includes programmable circuitry 1312. The programmable circuitry 1312 of the illustrated example is hardware. For example, the programmable circuitry 1312 can be implemented by one or more integrated circuits, logic circuits, FPGAs microprocessors, CPUs, GPUs, DSPs, and/or microcontrollers from any desired family or manufacturer. The programmable circuitry 1312 may be implemented by one or more semiconductor based (e.g., silicon based) devices. In this example, the processor circuitry 1312 implements the input identifier circuitry 202, the control allocation determiner circuitry 204, the control reallocation determiner circuitry 206, the actuator command rate and position limiter circuitry 208, the control power determiner circuitry 210, the error identifier circuitry 212, the filter applier circuitry 214, and the output generator circuitry 216.

The programmable circuitry 1312 of the illustrated example includes a local memory 1313 (e.g., a cache, registers, etc.). The programmable circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317. In some examples, the memory controller 1317 may be implemented by one or more integrated circuits, logic circuits, microcontrollers from any desired family or manufacturer, or any other type of circuitry to manage the flow of data going to and from the main memory 1314, 1316.

The programmable circuitry platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user (e.g., a human user, a machine user, etc.) to enter data and/or commands into the programmable circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output devices 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc. The programmable circuitry platform 1300 of the illustrated example also includes one or more mass storage devices 1328 to store software and/or data. Examples of such mass storage devices 1328 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine executable instructions 1332, which may be implemented by the machine readable instructions of FIGS. 4 and/or 6, may be stored in the mass storage device 1338, in the volatile memory 1314, in the non-volatile memory 1316, and/or on at least one non-transitory computer readable storage medium such as a CD or DVD which may be removable.

Figure 14:
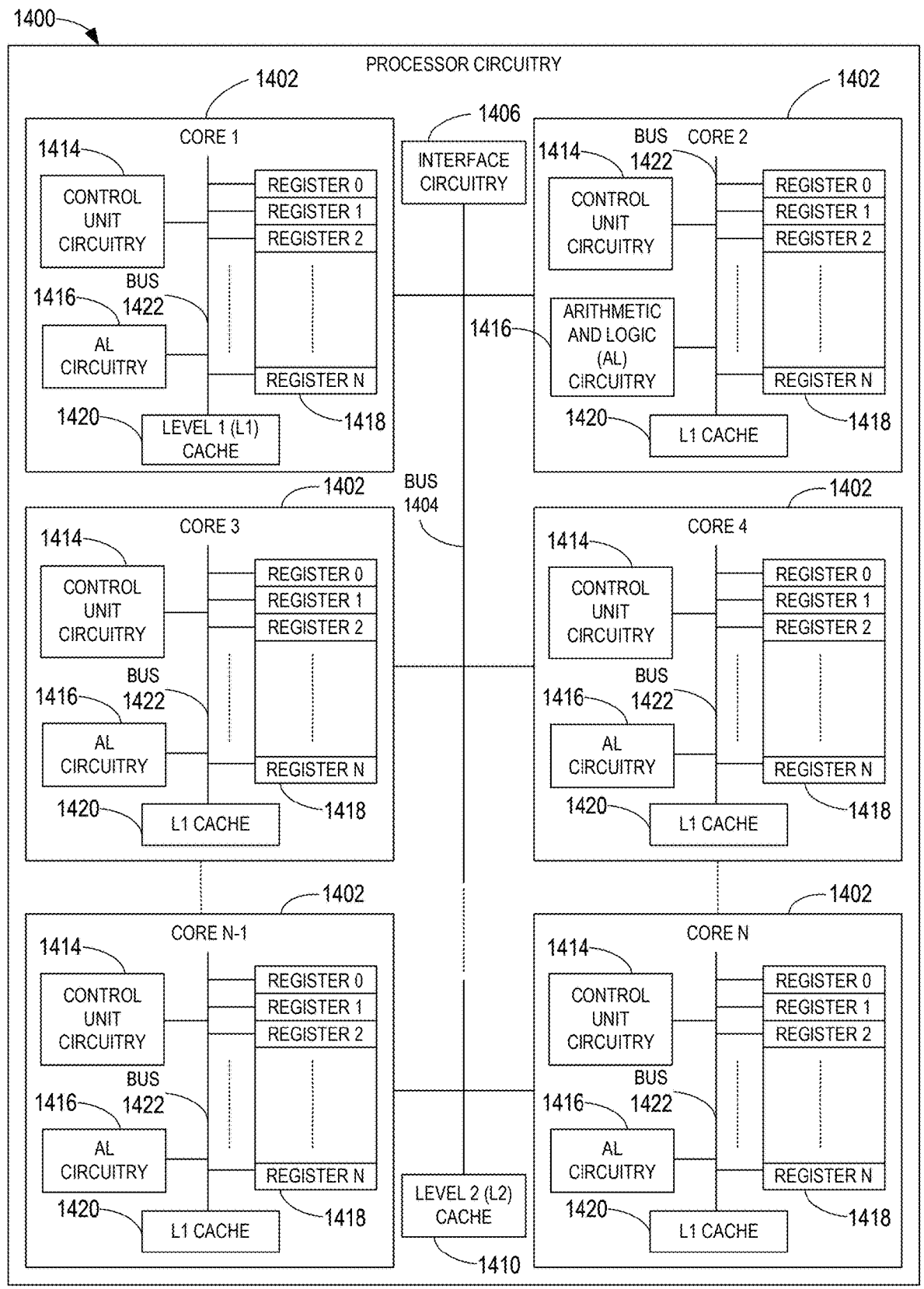
FIG. 14 is a block diagram of an example implementation of the programmable circuitry of FIG. 13.

FIG. 14 is a block diagram of an example implementation of the programmable circuitry 1312 of FIG. 13. In this example, the programmable circuitry 1312 of FIG. 13 is implemented by a microprocessor 1400. For example, the microprocessor 1400 may be a general purpose microprocessor (e.g., general purpose microprocessor circuitry). The microprocessor 1400 executes some or all of the machine readable instructions of the flowchart of FIGS. 3-4 to effectively instantiate the circuitry of FIG. 2 logic circuits to perform the operations corresponding to those machine readable instructions. In some such examples, the circuitry of FIG. 2 is instantiated by the hardware circuits of the microprocessor 1400 in combination with the instructions. For example, the microprocessor 1400 may implement multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine readable instructions and/or operations represented by the flowcharts of FIGS. 3-4.

The cores 1402 may communicate by a first example bus 1404. In some examples, the first bus 1404 may implement a communication bus to effectuate communication associated with one(s) of the cores 1402. For example, the first bus 1404 may implement at least one of an Inter-Integrated Circuit (I2C) bus, a Serial Peripheral Interface (SPI) bus, a PCI bus, or a PCIe bus. Additionally or alternatively, the first bus 1404 may implement any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2_cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1414, 1416 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the L1 cache 1420, and a second example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer-based operations. In other examples, the AL circuitry 1416 also performs floating-point operations. In yet other examples, the AL circuitry 1416 may include first AL circuitry that performs integer-based operations and second AL circuitry that performs floating point operations. In some examples, the AL circuitry 1416 may be referred to as an Arithmetic Logic Unit (ALU).

The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register(s), flag register(s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The second bus 1422 may be implemented by at least one of an I2C bus, a SPI bus, a PCI bus, or a PCIe bus.

Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages.

The microprocessor 1400 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1400, in the same chip package as the microprocessor 1400 and/or in one or more separate packages from the microprocessor 1400.

Figure 15:
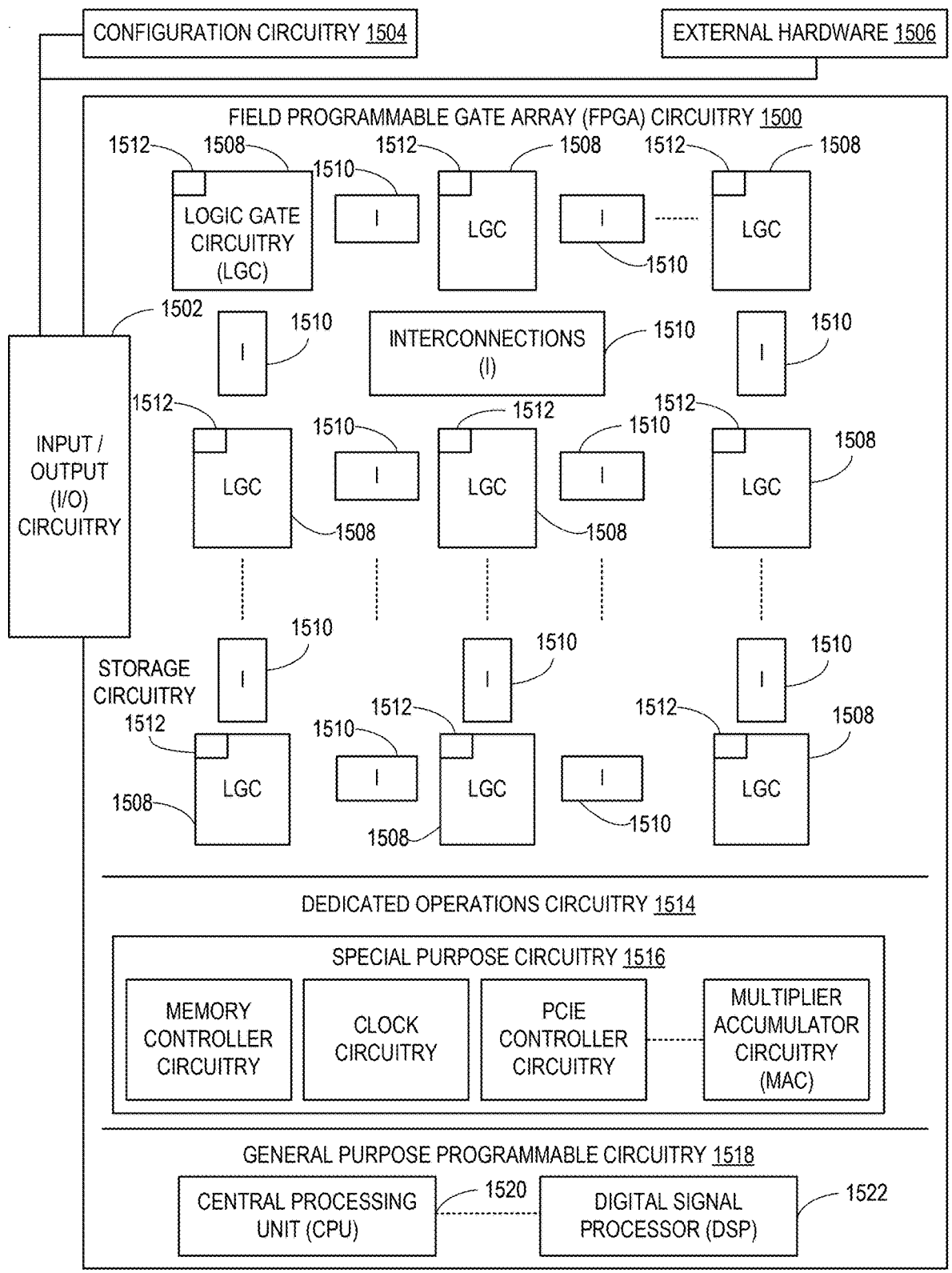
FIG. 15 is a block diagram of another example implementation of the programmable circuitry of FIG. 13.

FIG. 15 is a block diagram of another example implementation of the programmable circuitry of FIG. 13. In this example, the programmable circuitry 1312 is implemented by FPGA circuitry 1500. For example, the FPGA circuitry 1500 may be implemented by an FPGA. The FPGA circuitry 1500 can be used, for example, to perform operations that could otherwise be performed by the example microprocessor 1400 of FIG. 14 executing corresponding machine readable instructions. However, once configured, the FPGA circuitry 1500 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1400 of FIG. 14 described above (which is a general purpose device that may be programmed to execute some or all of the machine readable instructions represented by the flowcharts of FIGS. 3-4 but whose interconnections and logic circuitry are fixed once fabricated), the FPGA circuitry 1500 of the example of FIG. 15 includes interconnections and logic circuitry that may be configured, structured, programmed, and/or interconnected in different ways after fabrication to instantiate, for example, some or all of the operations/functions corresponding to the machine readable instructions represented by the flowcharts of FIGS. 3-4. In particular, the FPGA 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the instructions (e.g., the software and/or firmware) represented by the flowcharts of FIGS. 3-4. As such, the FPGA circuitry 1500 may be configured and/or structured to effectively instantiate some or all of the operations/functions corresponding to the machine readable instructions of the flowcharts of FIGS. 3-4 as dedicated logic circuits to perform the operations/functions corresponding to those software instructions in a dedicated manner analogous to an ASIC. Therefore, the FPGA circuitry 1500 may perform the operations/functions corresponding to the some or all of the machine readable instructions of FIGS. 3-4 faster than the general-purpose microprocessor can execute the same.

In the example of FIG. 15, the FPGA circuitry 1500 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1500 of FIG. 15 may access and/or load the binary file to cause the FPGA circuitry 1500 of FIG. 15 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1500 of FIG. 15 to cause configuration and/or structuring of the FPGA circuitry 1500 of FIG. 15, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1500 of FIG. 15 may access and/or load the binary file to cause the FPGA circuitry 1500 of FIG. 15 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1500 of FIG. 15 to cause configuration and/or structuring of the FPGA circuitry 1500 of FIG. 15, or portion(s) thereof.

The FPGA circuitry 1500 of FIG. 15, includes example input/output (I/O) circuitry 1502 to obtain and/or output data to/from example configuration circuitry 1504 and/or external hardware 1506. For example, the configuration circuitry 1504 may be implemented by interface circuitry that may obtain a binary file, which may be implemented by a bit stream, data, and/or machine-readable instructions, to configure the FPGA circuitry 1500, or portion(s) thereof. In some such examples, the configuration circuitry 1504 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1506 may be implemented by external hardware circuitry. For example, the external hardware 1506 may be implemented by the microprocessor 1400 of FIG. 14.

The FPGA circuitry 1500 also includes an array of example logic gate circuitry 1508, a plurality of example configurable interconnections 1510, and example storage circuitry 1512. The logic gate circuitry 1508 and the configurable interconnections 1510 are configurable to instantiate one or more operations/functions that may correspond to at least some of the machine readable instructions of FIGS. 3-4 and/or other desired operations. The logic gate circuitry 1508 shown in FIG. 15 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations/functions. The logic gate circuitry 1508 may include other electrical structures such as look-up tables (LUTs), registers (e.g., flip-flops or latches), multiplexers, etc.

The configurable interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example dedicated operations circuitry 1514. In this example, the dedicated operations circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 14 and 15 illustrate two example implementations of the programmable circuitry 1312 of FIG. 13, many other approaches are contemplated. For example, FPGA circuitry may include an on-board CPU, such as one or more of the example CPU 1520 of FIG. 15. Therefore, the programmable circuitry 1312 of FIG. 13 may additionally be implemented by combining at least the example microprocessor 1400 of FIG. 14 and the example FPGA circuitry 1500 of FIG. 15. In some such hybrid examples, one or more cores 1402 of FIG. 15 may execute a first portion of the machine readable instructions represented by the flowchart(s) of FIGS. 3-4 to perform first operation(s)/function(s), the FPGA circuitry 1500 of FIG. 15 may be configured and/or structured to perform second operation(s)/function(s) corresponding to a second portion of the machine readable instructions represented by the flowcharts of FIG. 3-4, and/or an ASIC may be configured and/or structured to perform third operation(s)/function(s) corresponding to a third portion of the machine readable instructions represented by the flowcharts of FIGS. 3-4.

It should be understood that some or all of the circuitry of FIG. 2 may, thus, be instantiated at the same or different times. For example, same and/or different portion(s) of the microprocessor 1400 of FIG. 14 may be programmed to execute portion(s) of machine-readable instructions at the same and/or different times. In some examples, same and/or different portion(s) of the FPGA circuitry 1500 of FIG. 15 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 1400 of FIG. 14 may execute machine readable instructions in one or more threads executing concurrently and/or in series. In some examples, the FPGA circuitry 1500 of FIG. 15 may be configured and/or structured to carry out operations/functions concurrently and/or in series. Moreover, in some examples, some or all of the circuitry of FIG. 2 may be implemented within one or more virtual machines and/or containers executing on the microprocessor 1400 of FIG. 14.

In some examples, the programmable circuitry 1312 of FIG. 13 may be in one or more packages. For example, the microprocessor 1400 of FIG. 14 and/or the FPGA circuitry 1500 of FIG. 15 may be in one or more packages. In some examples, an XPU may be implemented by the programmable circuitry 1312 of FIG. 13 which may be in one or more packages. For example, the XPU may include a CPU (e.g., the microprocessor 1400 of FIG. 14, the CPU 1520 of FIG. 15, etc.) in one package, a DSP (e.g., the DSP 1522 of FIG. 15) in another package, a GPU in yet another package, and an FPGA (e.g., the FPGA circuitry 1500 of FIG. 15) in still yet another package.

Example methods and apparatus for allocating control effector commands to reduce vehicle deviations from a commanded trajectory are disclosed herein. Further examples and combinations thereof include the following:

Example 1 includes an apparatus, comprising interface circuitry, machine readable instructions, and programmable circuitry to at least one of instantiate or execute the machine readable instructions to receive control force or moment command input associated with an over-actuated vehicle, the over-actuated vehicle including a first actuator and a second actuator, apply a rate or position limit based on actuator capability, and reassign control from the first actuator to the second actuator based on a lagged command position of the first actuator to preserve a control trajectory of the vehicle.

Example 2 includes the apparatus of example 1, wherein the programmable circuitry is to identify an error signal indicating a difference between the control force and moment command input and predicted forces or moments generated by actuator command output.

Example 3 includes the apparatus of example 2, wherein the programmable circuitry is to reassign control until the control force and moment command input matches the predicted force or moments generated by the actuator command output.

Example 4 includes the apparatus of example 1, wherein the programmable circuitry is to perform control reallocation to equalize an actuator position command to an objective function.

Example 5 includes the apparatus of example 1, wherein the programmable circuitry is to apply a complementary filter to obtain to obtain a low frequency component from actuator nonlinear dynamics and a high frequency component from a low-order actuator model estimate.

Example 6 includes the apparatus of example 5, wherein the programmable circuitry is to apply a notch filter upstream or downstream of the complementary filter to attenuate high frequency vibratory content in a feedback signal.

Example 7 includes the apparatus of example 1, wherein the programmable circuitry is to apply the rate or position limit to preserve commended force or moment trajectories for coupled actuators by slowing all coupled actuators proportionally.

Example 8 includes a method, comprising receiving control force or moment command input associated with an over-actuated vehicle, the over-actuated vehicle including a first actuator and a second actuator, applying a rate or position limit based on actuator capability, and reassigning control from the first actuator to the second actuator based on a lagged command position of the first actuator to preserve a control trajectory of the vehicle.

Example 9 includes the method of example 8, further including identifying an error signal indicating a difference between the control force and moment command input and predicted forces or moments generated by actuator command output.

Example 10 includes the method of example 9, further including reassigning control until the control force and moment command input matches the predicted forces or moments generated by actuator command output.

Example 11 includes the method of example 8, further including performing control reallocation to equalize an actuator position command to an objective function.

Example 12 includes the method of example 8, further including applying a complementary filter to obtain a low frequency component from actuator nonlinear dynamics and a high frequency component from a low-order actuator model estimate.

Example 13 includes the method of example 12, further including applying a notch filter upstream or downstream of the complementary filter to attenuate high frequency vibratory content in a feedback signal.

Example 14 includes the method of example 8, further including applying the rate or position limit to preserve commanded trajectories for actuators by slowing all coupled actuators proportionally.

Example 15 includes a non-transitory machine readable storage medium comprising instructions to cause programmable circuitry to at least receive control force or moment command input associated with an over-actuated vehicle, the over-actuated vehicle including a first actuator and a second actuator, apply a rate or position limit based on actuator capability, and reassign control from the first actuator to the second actuator based on a lagged command position of the first actuator to preserve a control trajectory of the vehicle.

Example 16 includes the machine readable storage medium as defined in example 15, wherein the instructions, when executed, cause the programmable circuitry to identify an error signal indicating a difference between the control force and moment command input and predicted forces or moments generated by actuator command output.

Example 17 includes the machine readable storage medium as defined in example 16, wherein the instructions, when executed, cause the programmable circuitry to reassign control until the control force and moment command input matches the predicted force or moments generated by the actuator command output.

Example 18 includes the machine readable storage medium as defined in example 15, wherein the instructions, when executed, cause the programmable circuitry to perform control reallocation to equalize an actuator position command to an objective function.

Example 19 includes the machine readable storage medium as defined in example 15, wherein the instructions, when executed, cause the programmable circuitry to apply a complementary filter to obtain a low frequency component from actuator nonlinear dynamics and a high frequency component from a low-order actuator model estimate.

Example 20 includes the machine readable storage medium as defined in example 19, wherein the instructions, when executed, cause the programmable circuitry to apply a notch filter upstream or downstream of the complementary filter to attenuate high frequency vibratory content in a feedback signal.

From the foregoing, it will be appreciated that example methods and apparatus have been disclosed that allocate control effector commands to reduce vehicle deviations from a commanded trajectory. For example, methods and apparatus disclosed herein can be used for allocating vehicle control force and moment commands to the vehicle's control effectors in a manner that reduces deviations from a commanded trajectory during both degraded and normal operation. In examples herein, integrators are incorporated into a feedback path to avoid introducing unwanted lag during normal operation that would increase vehicle deviations from a commanded trajectory. The integrators correct for degraded operation of one or more control effectors with a prescribed lag. Methods and apparatus disclosed herein include software-based primary control allocation mixing for trajectory control, secondary control reallocation mixing having no effect on trajectory control, control de-mixing, and feedback of the de-mixed control signals. Furthermore, methods and apparatus disclosed herein manage actuator rate-limit impingement in a highly coupled Multi-Input Multi-Output (MIMO) system (e.g., such that control trajectories are unaffected) and can introduce a complementary filter to use measured actuator outputs for reducing deviations from a commanded trajectory in the presence of undetected and/or undeclared control effector degradations.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:
1. An apparatus, comprising:
  interface circuitry;
  machine readable instructions; and programmable circuitry to at least one of instantiate or execute the machine readable instructions to:

receive control force or moment command input associated with an over-actuated vehicle, the over-actuated vehicle including a first actuator and a second actuator;

apply a rate or position limit based on actuator capability; and reassign control from the first actuator to the second actuator based on a lagged command position of the first actuator to preserve a control trajectory of the over-actuated vehicle.

2. The apparatus of claim 1, wherein the programmable circuitry is to identify an error signal indicating a difference between the control force and moment command input and predicted forces or moments generated by actuator command output.

3. The apparatus of claim 2, wherein the programmable circuitry is to reassign control until the control force and moment command input matches the predicted forces or moments generated by the actuator command output.

4. The apparatus of claim 1, wherein the programmable circuitry is to perform control reallocation to equalize an actuator position command to an objective function.

5. The apparatus of claim 1, wherein the programmable circuitry is to apply a complementary filter to obtain to obtain a low frequency component from actuator nonlinear dynamics and a high frequency component from a low-order actuator model estimate.

6. The apparatus of claim 5, wherein the programmable circuitry is to apply a notch filter upstream or downstream of the complementary filter to attenuate high frequency vibratory content in a feedback signal.

7. The apparatus of claim 1, wherein the programmable circuitry is to apply the rate or position limit to preserve commended force or moment trajectories for coupled actuators by slowing all coupled actuators proportionally.

8. A method, comprising:

receiving control force or moment command input associated with an over-actuated vehicle, the over-actuated vehicle including a first actuator and a second actuator;

applying a rate or position limit based on actuator capability; and reassigning control from the first actuator to the second actuator based on a lagged command position of the first actuator to preserve a control trajectory of the over-actuated vehicle.

9. The method of claim 8, further including identifying an error signal indicating a difference between the control force and moment command input and predicted forces or moments generated by actuator command output.

10. The method of claim 9, further including reassigning control until the control force and moment command input matches the predicted forces or moments generated by actuator command output.

11. The method of claim 8, further including performing control reallocation to equalize an actuator position command to an objective function.

12. The method of claim 8, further including applying a complementary filter to obtain a low frequency component from actuator nonlinear dynamics and a high frequency component from a low-order actuator model estimate.

13. The method of claim 12, further including applying a notch filter upstream or downstream of the complementary filter to attenuate high frequency vibratory content in a feedback signal.

14. The method of claim 8, further including applying the rate or position limit to preserve commanded trajectories for actuators by slowing all coupled actuators proportionally.

15. A non-transitory machine readable storage medium comprising instructions to cause programmable circuitry to at least:

receive control force or moment command input associated with an over-actuated vehicle, the over-actuated vehicle including a first actuator and a second actuator;

apply a rate or position limit based on actuator capability; and reassign control from the first actuator to the second actuator based on a lagged command position of the first actuator to preserve a control trajectory of the over-actuated vehicle.

16. The machine readable storage medium as defined in claim 15, wherein the instructions, when executed, cause the programmable circuitry to identify an error signal indicating a difference between the control force and moment command input and predicted forces or moments generated by actuator command output.

17. The machine readable storage medium as defined in claim 16, wherein the instructions, when executed, cause the programmable circuitry to reassign control until the control force and moment command input matches the predicted forces or moments generated by the actuator command output.

18. The machine readable storage medium as defined in claim 15, wherein the instructions, when executed, cause the programmable circuitry to perform control reallocation to equalize an actuator position command to an objective function.

19. The machine readable storage medium as defined in claim 15, wherein the instructions, when executed, cause the programmable circuitry to apply a complementary filter to obtain a low frequency component from actuator nonlinear dynamics and a high frequency component from a low-order actuator model estimate.

20. The machine readable storage medium as defined in claim 19, wherein the instructions, when executed, cause the programmable circuitry to apply a notch filter upstream or downstream of the complementary filter to attenuate high frequency vibratory content in a feedback signal.

* * * * *